US012225588B2

United States Patent
Nunome et al.

(10) Patent No.: US 12,225,588 B2
(45) Date of Patent: *Feb. 11, 2025

(54) WIRELESS STATION AND COMMUNICATION METHOD FOR DETERMINING TRANSMISSION TO ANOTHER WIRELESS STATION IN A CELL IN VIEW OF AN INTERFERENCE CELL

(71) Applicant: Panasonic Intellectual Property Corporation of America, Torrance, CA (US)

(72) Inventors: Tomoya Nunome, Ishikawa (JP); Takashi Iwai, Ishikawa (JP); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,900

(22) Filed: May 9, 2024

(65) Prior Publication Data

US 2024/0292461 A1  Aug. 29, 2024

Related U.S. Application Data

(63) Continuation of application No. 18/356,000, filed on Jul. 20, 2023, now Pat. No. 12,010,725, which is a
(Continued)

(30) Foreign Application Priority Data

May 13, 2016  (JP) .................................. 2016-097177

(51) Int. Cl.
*H04W 72/04*  (2023.01)
*H04W 74/00*  (2009.01)
(Continued)

(52) U.S. Cl.
CPC ..... *H04W 74/0816* (2013.01); *H04W 74/006* (2013.01); *H04W 74/08* (2013.01); *H04W 84/12* (2013.01); *H04W 52/245* (2013.01)

(58) Field of Classification Search
CPC .......... H04W 74/0816; H04W 74/006; H04W 84/12; H04W 52/245; Y02D 30/70
See application file for complete search history.

(56) References Cited

U.S. PATENT DOCUMENTS 10,154,520 B1  12/2018 Hedayat et al.
10,251,065 B1  4/2019 Jiang et al.
(Continued)

FOREIGN PATENT DOCUMENTS

| JP | 7312225 B2 | 7/2023 |
|---|---|---|
| WO | WO 2015088160 A1 | 6/2015 |
| WO | WO 2015112780 A1 | 7/2015 |

OTHER PUBLICATIONS

IEEE 802.11-15/0132r15, "Specification Framework for TGax", Jan. 28, 2016.
(Continued)

*Primary Examiner* — Mahbubul Bar Chowdhury
(74) *Attorney, Agent, or Firm* — Seed IP Law Group LLP

(57) ABSTRACT

A wireless station that belongs to a communication cell includes a receiver which, in operation, receives a trigger frame transmitted from an access point that belongs to an interference cell and a controller which, in operation, determines, based on at least one parameter included in the trigger frame and reception power value of the trigger frame received at the wireless station, whether the wireless station is allowed to transmit to other wireless station that belongs to the communication cell, wherein the at least one parameter includes a value set based on transmit power value of the trigger frame transmitted from the access point.

6 Claims, 16 Drawing Sheets

Related U.S. Application Data continuation of application No. 17/852,238, filed on Jun. 28, 2022, now Pat. No. 11,751,247, which is a continuation of application No. 16/183,280, filed on Nov. 7, 2018, now Pat. No. 11,405,957, which is a continuation of application No. PCT/JP2017/010123, filed on Mar. 14, 2017.

(51) Int. Cl.
| | | |
|---|---|---|
| *H04W 74/08* | (2009.01) | |
| *H04W 74/0816* | (2024.01) | |
| *H04W 84/12* | (2009.01) | |
| *H04W 52/24* | (2009.01) | |

(56) References Cited

U.S. PATENT DOCUMENTS

| | | |
|---|---|---|
| 2013/0235737 A1 | 9/2013 | Merlin et al. |
| 2015/0078299 A1 | 3/2015 | Barriac et al. |
| 2016/0174079 A1 | 6/2016 | Wang et al. |
| 2016/0249366 A1 | 8/2016 | Seok |
| 2016/0286499 A1 | 9/2016 | Lim et al. |
| 2017/0070961 A1 | 3/2017 | Bharadwaj et al. |
| 2017/0070962 A1 | 3/2017 | Wang et al. |
| 2017/0105217 A1 | 4/2017 | Kwon et al. |
| 2017/0135046 A1 | 5/2017 | Sutskover et al. |
| 2017/0135131 A1 | 5/2017 | Hart et al. |
| 2017/0181102 A1 | 6/2017 | Bharadwaj et al. |
| 2017/0188368 A1 | 6/2017 | Cariou et al. |
| 2017/0188376 A1 | 6/2017 | Noh et al. |
| 2017/0223563 A1 | 8/2017 | Yang et al. |
| 2018/0084472 A1 | 3/2018 | Cariou et al. |
| 2018/0249501 A1 | 8/2018 | Ko et al. |
| 2018/0302862 A1 | 10/2018 | Takata et al. |
| 2018/0324859 A1 | 11/2018 | Kim et al. |
| 2018/0332540 A1 | 11/2018 | Lou et al. |
| 2018/0376423 A1 | 12/2018 | Atefi |
| 2019/0021091 A1 | 1/2019 | Ko et al. |
| 2019/0082467 A1 | 3/2019 | Nunome et al. |
| 2019/0342017 A1 | 11/2019 | Barriac et al. |

OTHER PUBLICATIONS

IEEE 802.11-15/1104r4, "TXOP Considerations for Spatial Reuse", Sep. 17, 2015.
IEEE 802.11-15/1109r1, "OBSS NAV and PD Threshold Rule for Spatial Reuse", Sep. 15, 2015.
IEEE 802.11-15/1338r1, "Improving Spatial Reuse During OBSS UL MU Procedure", Nov. 11, 2015.
IEEE 802.11-15/1348r0, "Multiple NAVs for Spatial Reuse", Nov. 8, 2015.
IEEE 802.11-16/0060r3, "Recipient-aware Spatial Reuse", Jan. 20, 2016.
IEEE 802.11-16/0415r1, IEEE 802.11 TGax, Mar. 2016 Macau Meeting Minutes (Year: 2016).
Indian Examination Report dated Feb. 19, 2021 for the related Indian Patent Application No. 201847041740, 5 pages.
Inoue, "IEEE 802.11 TGax Mar. 2016 Macau Meeting Minutes," IEEE 802.11-16/0415r11, Mar. 31, 2016. (26 pages).
International Search Report of PCT application No. PCT/JP2017/010123 dated Jun. 6, 2017 (with translation).
Oteri et al., Power Control for Multi-User Transmission in 802.11ax, IEEE 802.11-16/0331r1, Mar. 13, 2016. (22 pages).
Stacey, "Specification Framework for TGax," IEEE 802.11-15/0132r15, Mar. 17, 2016. (50 pages).
The Extended European Search Report dated Mar. 28, 2019 for the related European Patent Application No. 17795819.6.
Yasuhiko Inoue (NTT): "tgax-march-2016-macau-meeting-minutes; 11-16-0415-01-00ax-tgax-march-2016-macau-meeting-minutes", IEEE Draft; 11-16-0415-01-00AX-TGAX-MARCH-2016-MACAU-MEETING-MINUTES, IEEE—SA Mentor, Piscataway, NJ USA, vol. 802.11ax, No. 1, Apr. 20, 2016 (Apr. 20, 2016), pp. 1-26, XP068106676, [retrieved on Apr. 20, 2016].

WIRELESS STATION AND COMMUNICATION METHOD FOR DETERMINING TRANSMISSION TO ANOTHER WIRELESS STATION IN A CELL IN VIEW OF AN INTERFERENCE CELL

BACKGROUND

1. Technical Field

The present disclosure relates to a wireless station and communication method for performing good wireless communication in an environment where interference between wireless stations occurs.

2. Description of the Related Art

At the Institute of Electrical and Electronics Engineers (IEEE) 802.11 task group (TG) ax, formulation of technical specifications for IEEE 802.11 ax (hereinafter, 11 ax) is proceeding, as the standard to follow IEEE 802.11 ac. In the IEEE 802.11 standard, a basic service set (BSS) is defined as a set of wireless stations (referred to a station or STA) making up a basic wireless network. A BASS is configured of one access point and multiple terminals (wireless stations other than the access point) in infrastructure mode, and configured of multiple terminals in ad hoc mode. An ad hoc mode BSS is called an independent BSS (IBSS), differentiated from an infrastructure mode BSS. BSSs other than a BSS to which an own terminal (or access point) belongs (intra-BSS) is referred to as an overlapping BSS (OBSS) or inter-BSS. Multiple communication cells overlap among OBSSs, so interference occurs among communication cells in communication among OBSSs, and communication quality deteriorates.

In wireless communication, a state where wireless signals do not reach each other among wireless stations (electromagnetic (EM) environment where carrier sensing does not function) can occur, due to distance between wireless stations, effects of obstructions, and so forth. As a measure for such an environment, i.e., an environment where hidden terminals exist, the IEEE 802.11 has prepared a collision-prevention function using a network allocation vector (NAV). Upon receiving a wireless frame for NAV settings at a predetermined threshold value or higher, the access point and terminals are forbidden to transmit during a NAV period set in duration information, except for cases where the wireless frame for NAV settings is a frame addressed to the own terminal or own access point. A minimum reception sensitivity value is normally used for the threshold value to judge whether or not to set a NAV.

Also, it has been agreed upon to introduce spatial reuse (SR), where the wireless resources used by OBSSs are reused, in 11ax (see Robert Stacey, "Specification Framework for TGax", IEEE 802.11-15/0132r15). The object of SR is to increase transmission opportunities of terminals (or access points) in cases where interference affecting OBSSs (hereinafter, interfering) is small, to improve the utilization rate, thereby improving communication performance of the wireless network. One method to realize SR is to set a threshold value for judging whether or not to set a NAV in a case of having received a wireless frame from an OBSS under particular conditions (hereinafter referred to as OBSS power density (OBSS_PD)) to a value greater than the minimum reception sensitivity value that is normally used.

CITATION LIST

Summary

However, in a case where the level of interfering on the OBSS is greater than the predetermined threshold value in a case where a terminal (or access point) erroneously estimates the magnitude of interfering and cancels a regular NAV, a situation can occur where interference occurs with regard to terminals (or access points) in OBSSs to a level where terminals in the OBSSs cannot correctly detect reception signals, and communication performance of the wireless network deteriorates.

One non-limiting and exemplary embodiment provides a wireless station and communication method where inappropriate regular NAV cancellation is prevented, and communication performance is improved.

In one general aspect, the techniques disclosed here feature a wireless station that belongs to a communication cell. (Original) The wireless station includes: a receiver which, in operation, receives a trigger frame transmitted from an access point that belongs to an interference cell; and a controller which, in operation, determines, based on at least one parameter included in the trigger frame and reception power value of the trigger frame received at the wireless station, whether the wireless station is allowed to transmit to other wireless station that belongs to the communication cell, wherein the at least one parameter includes a value set based on transmit power value of the trigger frame transmitted from the access point.

According to one aspect of the present disclosure, inappropriate regular NAV cancellation is prevented, and communication performance of a wireless network can be improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
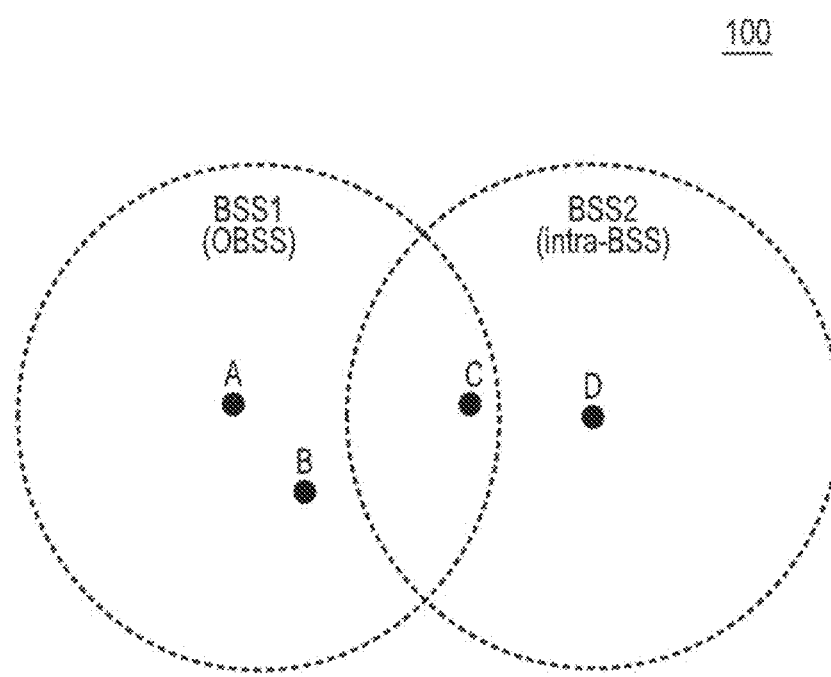
FIG. 1 is a diagram illustrating positional relation among access points and terminals in a first embodiment.

Embodiments of the present disclosure will be described below with reference to the drawings. Note however, that unnecessarily detailed description, for example detailed description of already well-known items, redundant description of configurations that are substantially the same, and so forth, may be omitted. It should be understood that the following description and the referenced drawings are provided to facilitate understanding of the present disclosure by those skilled in the art, and do not restrict the Claims of the present disclosure.

Background of Present Disclosure

The background of the present disclosure will be briefly described. It has been agreed upon in 11ax to manage NAVs separately in each of intra-BSSs and OBSSs (see Sigurd Schelstraete, "Multiple NAVs for Spatial Reuse", IEEE 802.11-15/1348). Accordingly, situations where a NAV of an intra-BSS is cancelled by a NAV cancellation request (contention free-end (CF-End) or a NAV of an OBSS is cancelled by a CF-End of an intra-BSS, are avoided. In order to simplify SR processing, in 11ax, terminals (or access points) do not distinguish NAVs for each OBSS in cases where there are multiple OBSSs, and manage two NAVs which are intra-BSS NAVs and regular NAVs (NAVs in a case whether a NAV of an OBSS, or a NAV of an intra-BSS, cannot be distinguished).

Further, 11ax proposes, as one SR method, to cancel regular NAVs other than in cases of having received a CF-End frame (NAV cancellation request frame) under particular conditions (see Reza Hedayat, "TXOP Considerations for Spatial Reuse," IEEE 802.11-15/1104). In this method, a combination of trigger signal and response signal is used to estimate the magnitude of interfering as to a terminal (or access point) of an OBSS, and cancellation of regular NAV is performed. In a case where the magnitude of interfering regarding the OBSS is suppressed to smaller than a predetermined threshold value obtained through experience, for example, this method further improves the effects of SR.

Reza Hedayat, "Recipient-aware Spatial Reuse," IEEE 802.11-16/0060, discloses cancelling regular NAVs in a case where a terminal (or access point) satisfies the following conditions. A first condition is a condition that when an inter-BSS Request to Send (RTS) frame is received, the received signal strength indication (RSSI) is higher than the OBSS_PD (threshold value applied in case object is OBSS). A second condition is when an inter BSS Clear to Send (CTS) frame is received, the RSSI is lower than a predetermined NAV cancellation threshold value.

Also, Geonjung Ko, "Improving Spatial Reuse During OBSS UL MU Procedure", IEEE 802.11-15/1338, discloses cancelling regular NAVs when a terminal (or access point) detects an uplink multi-user physical layer convergence protocol data unit (UL MU PPDU) transmitted following a trigger frame, in a case where the RSSI of the trigger frame is lower than the OBSS_PD.

However, in a case where the RSSI measurement precision of the terminal is low, the distance between terminals is near, or the like, regular NAVs can be erroneously cancelled. As a result, there may be cases where interference of OBSS_RD or greater occurs with regard to a terminal (or access point) of the OBSS, and desired signals cannot be correctly received. It is from this background that there is demand to prevent inappropriate cancellation of regular NAVs. A wireless station and communication method where inappropriate regular NAV cancellation is prevented, and communication performance of the wireless network is improved, will be described in the embodiments of the present disclosure described below. Note that in the following embodiments, a terminal or access point corresponds to a wireless station.

First Embodiment

FIG. 1 is a diagram exemplifying the positional relation of access points and terminals configuring a wireless network 100 according to a first embodiment. Existing in the wireless network 100 are, as illustrated in FIG. 1, an access point A, a terminal B, a terminal C, and an access point D. The access point A and terminal B belong to a BSS1 (OBSS), and the terminal C and access point D belong to a BSS2 (intra-BSS).

Description of Configuration

Figure 2:
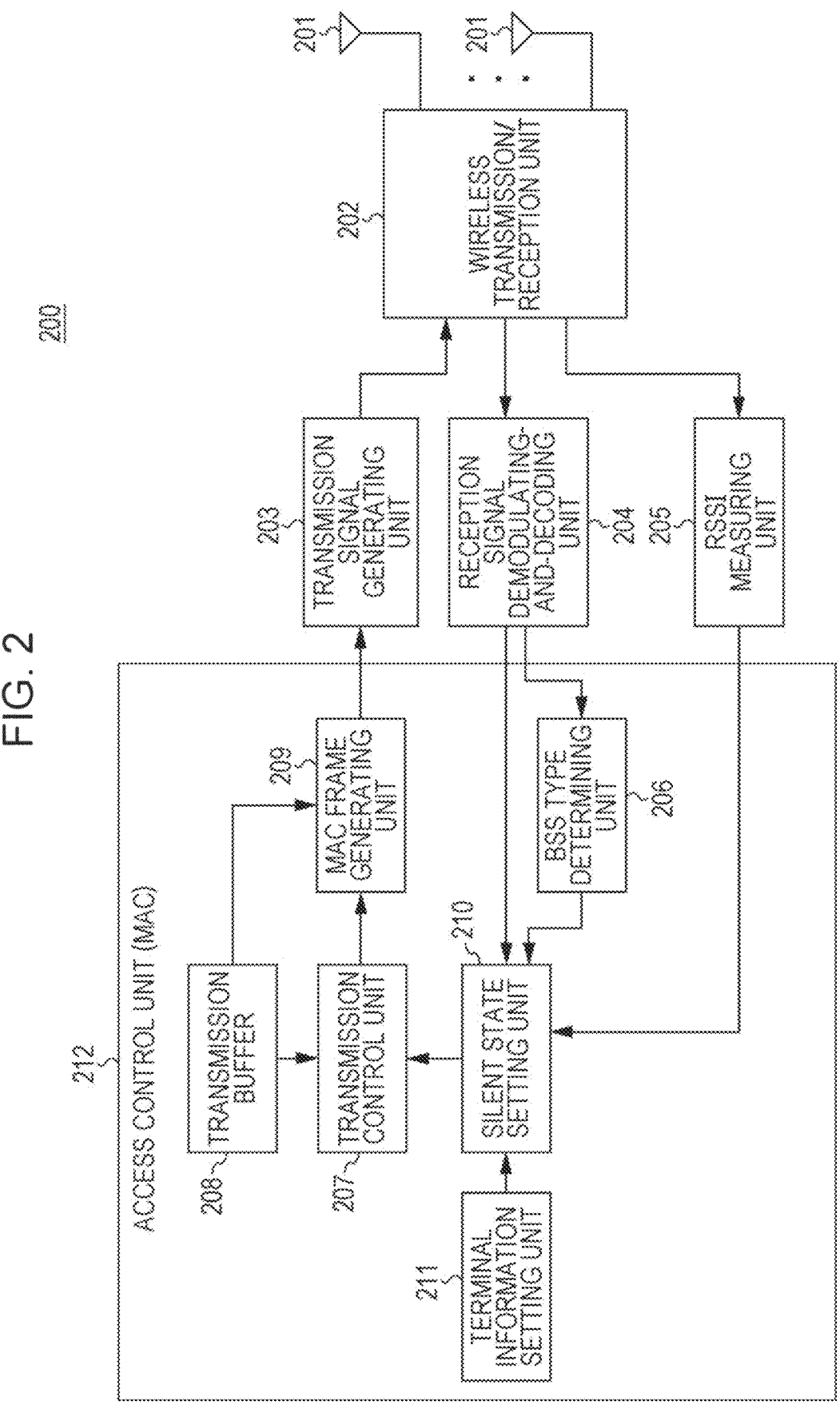
FIG. 2 is a block diagram illustrating an example of the configuration of a terminal used in the first embodiment.

FIG. 2 is a block diagram illustrating an example of the configuration of a terminal 200 according to the first embodiment. The terminal 200 illustrated in FIG. 2 corresponds to the terminal C illustrated in FIG. 1. Note that the configurations of the access points A and D, and the terminal B, illustrated in FIG. 1, may also be the same configuration as that of the terminal 200 illustrated in FIG. 2.

As illustrated in FIG. 2, the terminal 200 has transmission/reception antennas 201, a wireless transmission/reception unit 202, a transmission signal generating unit 203, a reception signal demodulating-and-decoding unit 204, an RSSI measuring unit 205, a BSS type determining unit 206, a transmission control unit 207, a transmission buffer 208, a MAC frame generating unit 209, a silent state setting unit 210, and a terminal information setting unit 211. Also, the BSS type determining unit 206, transmission control unit 207, transmission buffer 208, MAC frame generating unit 209, silent state setting unit 210, and terminal information setting unit 211 make up an access control unit 212 (MAC).

The transmission/reception antenna 201 is at least one antenna, that transmits and receives wireless signals. When transmitting, the wireless transmission/reception unit 202 performs predetermined wireless transmission processing such as subjecting transmission signals input from the transmission signal generating unit 203 to D/A conversion, upconverting to a carrier frequency, and so forth, and transmits transmission signals via the transmission/reception antenna 201. When receiving, the wireless transmission/reception unit 202 performs predetermined wireless reception processing such as downconversion, A/D conversion, and so forth, of wireless signals received via the transmission/reception antenna 201, and outputs the received wireless signals to the reception signal demodulating-and-decoding unit 204 and RSSI measuring unit 205.

The transmission signal generating unit 203 encodes and modulates MAC frames input from the MAC frame generating unit 209, adds pilot signals used for frequency synchronization and timing synchronization at the reception side, and control signals such as channel estimation signals (also referred to as preamble) to generate a wireless frame (also referred to as PPDU), which is output to the wireless transmission/reception unit 202.

The reception signal demodulating-and-decoding unit 204 subjects the wireless signals, that have been input from the wireless transmission/reception unit 202 and subjected to wireless reception processing, to autocorrelation processing and so forth to extract a wireless frame, and performs demodulation and decoding of the wireless frame. The reception signal demodulating-and-decoding unit 204 also extracts the preamble information (control signals of the wireless frame) and MAC frame from the wireless signals input from the wireless transmission/reception unit 202, and outputs the preamble information to the BSS type determining unit 206, and the MAC frame to the silent state setting unit 210.

The RSSI measuring unit 205 measures the RSSI based on the wireless signals input from the wireless transmission/reception unit 202 after the wireless reception processing, and outputs RSSI information including the measurement results to the silent state setting unit 210.

The BSS type determining unit 206 extracts BSS identification information (hereinafter referred to as BSS color) included in the preamble information input from the reception signal demodulating-and-decoding unit 204, and determines the type of BSS that the terminal (or access point) that the terminal which has transmitted the received wireless signals belongs to. The BSS type determining unit 206 determines the BSS to be an intra-BSS in a case where the BSS color included in the preamble information and the BSS color of the BSS that the terminal 200 itself belongs to is the same, and otherwise determines to be an OBSS. The BSS type determining unit 206 outputs BSS type information (information indicating whether intra-BSS or not) as determination results to the silent state setting unit 210.

The transmission control unit 207 performs transmission control based on silent state information (information indicating whether or not transmission is forbidden, i.e., a NAV is set) input from the silent state setting unit 210, and buffer state information (information indicating whether or not there is transmission data) input from the transmission buffer 208. Specifically, in a case where no NAV has been set and there is transmission data in the transmission buffer 208, the transmission control unit 207 outputs a transmission data generating instruction to the MAC frame generating unit 209.

The transmission buffer 208 stores transmission data that the terminal 200 transmits to another terminal (or access point). The transmission buffer 208 also outputs buffer state information, indicating whether or not there is transmission data, to the transmission control unit 207.

The MAC frame generating unit 209 performs MAC frame generating processing such as adding a MAC header to transmission data input from the transmission buffer 208, and so forth, based on the transmission data generating instruction input from the transmission control unit 207. The MAC frame generating unit 209 outputs the generated MAC frame to the transmission signal generating unit 203.

The silent state setting unit 210 performs NAV settings based on the RSSI information input from the RSSI measuring unit 205, the MAC frame input from the reception signal demodulating-and-decoding unit 204, RSSI measurement precision information input from the terminal information setting unit 211, and BSS type information input from the BSS type determining unit 206. Specifically, the silent state setting unit 210 preforms NAV settings in a case of a MAC frame instructing NAV settings, such as an RTS/CTS frame or the like. Also, the silent state setting unit 210 performs NAV cancellation in a case of the set NAV period having expired, or a CF-End frame instructing NAV cancellation is received.

Note that when setting a NAV, the silent state setting unit 210 distinguishes between intra-BSS NAV and regular NAV states, so the above-described NAV settings and NAV cancellations are performed with regard to the respective NAVs. Specifically, in a case of having received a MAC frame from the intra-BSS for example, the silent state setting unit 210 performs intra-BSS settings, and in a case of having received a MAC frame from the OBSS, performs regular NAV settings.

Note however, that the silent state setting unit 210 performs determination of whether or not to cancel a NAV using a later-described NAV cancellation determination method, and in a case where determination is made in this determining to cancel a NAV, regular NAV cancellation is performed even other than the above-described (case of set NAV period having expired, or having received a CF-End frame). The silent state setting unit 210 outputs silent state information relating to NAV settings or NAV cancellation to the transmission control unit 207.

The terminal information setting unit 211 outputs RSSI measurement precision information of the terminal 200 itself to the silent state setting unit 210. 11ax supports two types of terminal classes (also referred to as STA Classes) with different precision requirements for RSSI measurement precision and so forth, and RSSI measurement precision information is information set based on the terminal class of the terminal 200 itself.

According to this configuration, in the first embodiment, setting a threshold value for regular NAV cancellation determination taking the RSSI measurement precision into consideration enables a terminal with a low RSSI measurement precision in appropriately performing NAV cancelation based on RSSI measurement error, that would result in a situation of great interfering on the OBSS, to be prevented. A specific operation example of the wireless network 100 according to the first embodiment will be described below.

Operation Example

Figure 3:
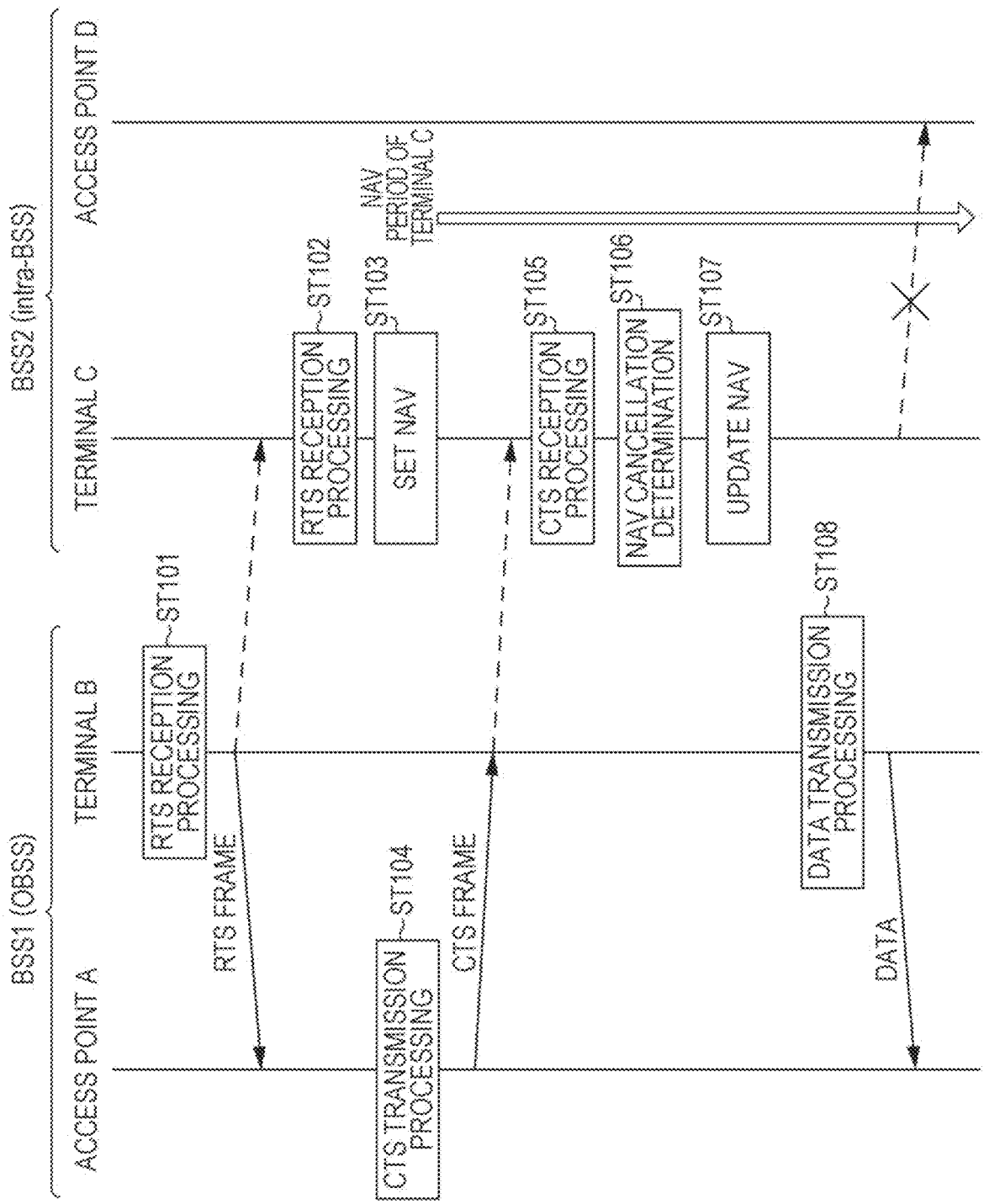
FIG. 3 is a sequence diagram illustrating an operation example of a wireless network when exchanging RTS/CTS frames in the first embodiment.

FIG. 3 is a sequence diagram illustrating an operation example of the wireless network 100 when transmitting/receiving a RTS/CTS frame in the first embodiment. First, the terminal B performs transmission processing of an RTS (Request to Send: trigger signal for CTS) to request the access point A for CTS transmission, as illustrated in FIG. 3

(ST101). The terminal C performs reception processing of the RTS frame from the terminal B (ST102). RTS frame reception processing includes RSSI measurement of the RTS frame. Note that the RSSI measurement method is not restricted in particular in the present disclosure, and a known RSSI measurement method can be used. The terminal C sets a regular NAV in accordance with the RTS (ST103).

Next, in response to the RTS frame from the terminal B, the access point A transmits a CTS (Clear to Send) frame that is a response signal (ST104). Upon receiving the CTS from the access point A, the terminal C performs RSSI measurement (ST105). Based on the RSSI of the CTS frame, the terminal C performs determination regarding whether or not to perform cancellation of the regular NAV (ST106). Details of the regular NAV cancellation determination method in ST106 will be described later.

Figure 4:
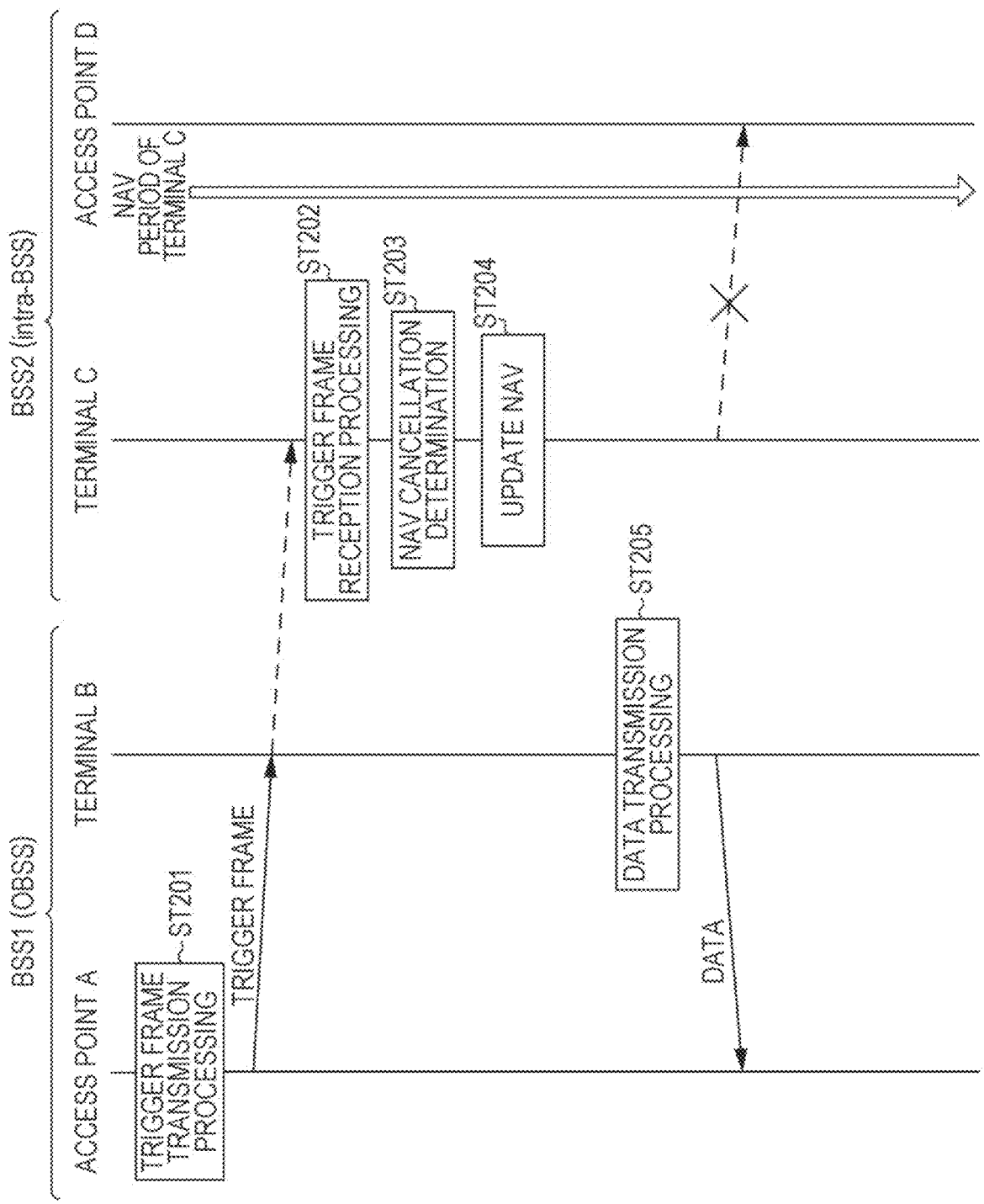
FIG. 4 is a sequence diagram illustrating an operation example of a wireless network when exchanging trigger frames in the first embodiment.

FIG. 3 exemplifies a case where determination is made in ST106 not to cancel the regular NAV. In this case, the terminal C updates the regular NAV in accordance with the CTS frame (ST107). Next, the terminal B transmits data to the access point A (ST108). At this time, the regular NAV has been set at the terminal C, so the terminal C does not perform transmission to the access point D. On the other hand, FIG. 4 is a sequence diagram illustrating an operation example of the wireless network 100 when transmitting/receiving a trigger frame in the first embodiment. In FIG. 4, the terminal C has set a regular NAV beforehand.

First, the access point A performs trigger frame transmission processing to the terminal B (ST201), as illustrated in FIG. 4. The terminal C performs reception processing of the trigger frame from the access point A (ST202). Trigger frame reception processing includes RSSI measurement of the trigger frame. Based on the RSSI measurement results of the trigger frame, the terminal C performs determination regarding whether or not to perform cancellation of the regular NAV (ST203). Details of the regular NAV determination method in ST203 will be described later.

FIG. 4 exemplifies a case where determination is made in ST203 to not cancel the regular NAV. In this case, the terminal C updates the regular NAV in accordance with the trigger frame (ST204). Next, the terminal B transmits data to the access point A (ST205). At this time, the regular NAV has been set at the terminal C, so the terminal C does not perform transmission to the access point D.

NAV Cancellation Determination Method 1

Details of the determination method of whether to cancel a regular NAV or not, in ST106 in FIG. 3 or ST203 in FIG. 4 will be described below. The NAV cancellation determination method 1 described below corresponds to the determination method in ST106 in FIG. 3. In the NAV cancellation determination method 1, the terminal C performs setting of threshold values to be used for NAV cancellation determination, based on the RSSI measurement precision information of the terminal itself, or on terminal class (STA Classes). The terminal C sets a threshold value regarding trigger signals (first threshold value) and a threshold value regarding response signals (second threshold value). Now, a trigger signal is an RTS frame for example, and a response signal is a CTS frame for example. The first and second threshold values are set higher than the threshold value regarding intra-BSS signals.

11ax supports two types of terminal classes with different precision requirements such as RSSI measurement precision and so forth. Class A is high-performance terminals, and error within ±2 dB is required for RSSI measurement precision. On the other hand, Class B is low-performance terminals, and error within ±5 dB is required for RSSI measurement precision. That is to say, the Class B terminals are permitted an RSSI measurement error of up to 3 dB more than Class A terminals.

Accordingly, in order to keep interfering with other terminals due to RSSI measurement error at Class B terminals to around the same as Class A, Class B terminals need to have a different threshold value set from Class A. Specifically, this can be done by setting the first threshold value for Class B terminals to be 3 dB higher than the first threshold value at Class A, and setting the second threshold value for Class B terminals to be 3 dB lower than the second threshold value at Class A. This value of 3 dB is a value based on the difference in RSSI measurement precision required at each of the Class A terminals and Class B terminals described above. It is sufficient to set the first threshold value to the second threshold value or higher.

In a case of having received a trigger signal (RTS frame) form the OBSS (ST102 in FIG. 3), the terminal C measures the RSSI of the RTS frame, and determines whether higher than the first threshold value or not. Further, the terminal C measures the RSSI of the response signal (CTS frame) transmitted from the OBSS, and determines whether lower than the second threshold value or not. In a case where the RSSI of the RTS frame is higher than the first threshold value and also the RSSI of the CTS frame is lower than the second threshold value, the terminal C cancels the regular NAV. Note that an arrangement may be made where the terminal C does not perform determination of whether the RSSI of the RTS frame is higher than the first threshold value, and performs determination of whether or not to cancel the regular NAV based only on the determination results of whether the RSSI of the CTS frame is lower than the second threshold value.

According to this determination method, even in a case where the terminal C is a Class B terminal, i.e., a terminal with relatively low RSSI measurement precision, regular NAV cancellation determination can be performed based on threshold values set taking into consideration the measurement precision. Accordingly, even in a case where the terminal C is a Class B terminal, i.e., a terminal with relatively low RSSI measurement precision, interference on an OBSS terminal (or access point) can be reduced. Thus, inappropriate regular NAV cancellation can be prevented, and communication performance of the wireless network can be improved. Note that the first or second threshold values at Class A terminals can be OBSS_PD, for example.

NAV Cancellation Determination Method 2

A NAV cancellation determination method 2 described below corresponds to the determination method of ST203 in FIG. 4. In the NAV cancellation determination method 2, the terminal C performs setting of threshold values to be used for NAV cancellation determination, based on the RSSI measurement precision information of the terminal itself, or on terminal class. The terminal C sets a threshold value regarding trigger signals. A trigger signal is a trigger frame for example. This threshold value is set higher than the threshold value regarding intra-BSS signals.

The NAV cancellation determination method 2 differs from the determination method 1 in that the RSSI of the trigger frame is used for determination. When having received a trigger frame from the OBSS, the terminal C determines whether or not the RSSI of the trigger frame is lower than the threshold value. In a case where the RSSI of the trigger frame is lower than the threshold value, the terminal C cancels the regular NAV. Note that the method of setting the threshold value may be the same as the setting method for the second threshold value in the above-described NAV cancellation determination method 1 (i.e., set 3 dB lower than the OBSS_PD), or a different setting method may be employed.

Due to such a determination method, cancellation determination of a regular NAV can be performed based on the threshold value set taking measurement precision into consideration in the same way as in the NAV cancellation determination method 1, even in a case where the terminal C is a terminal with relatively low RSSI measurement precision. Accordingly, even in a case where the terminal C is a terminal with relatively low RSSI measurement precision, interference on an OBSS terminal (or access point) can be reduced. Thus, inappropriate regular NAV cancellation can be prevented, and communication performance of the wireless network can be improved.

Second Embodiment

Figure 5:
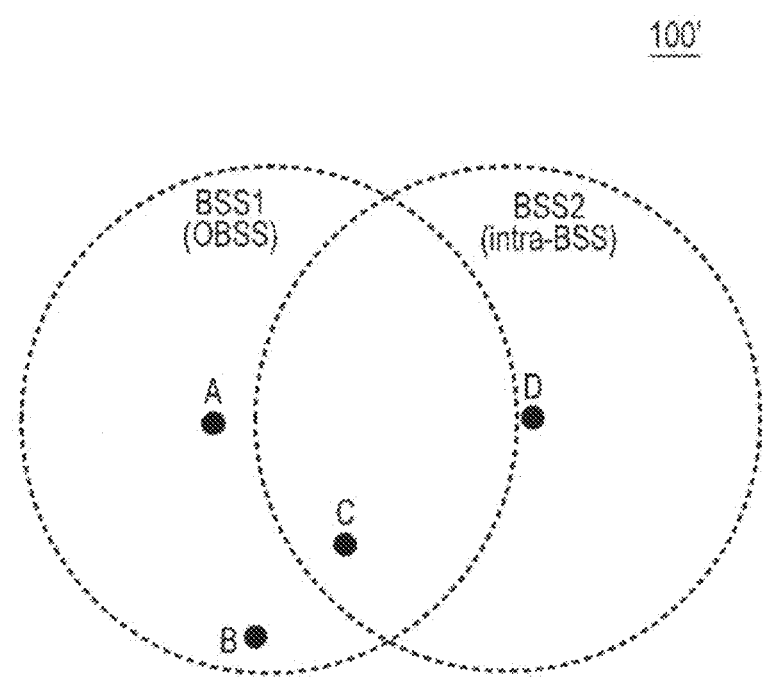
FIG. 5 is a diagram illustrating positional relation among access points and terminals making up a wireless network in a second embodiment.

A second embodiment will be described below. FIG. 5 is a diagram illustrating the positional relation of access points and terminals configuring a wireless network 100' according to the second embodiment. The wireless network 100' is the same with the first embodiment illustrated in FIG. 1 with regard to the point that the access point A and terminal B belong to the BSS1 (OBSS), and the terminal C and access point D belong to the BSS2 (intra-BSS), but the distance between the terminal B and terminal C is closer as compared to the first embodiment, as illustrated in FIG. 5.

In a case where the distance between the terminal B and terminal C is relatively close, the RSSI of transmission signals from the terminal C to the terminal B is a strength close to the RSSI of transmission signals from the access point A to the terminal B, and the reception quality of transmission signals from the access point A to the terminal B may deteriorate by interference from the terminal C. In such a case, the probability of the terminal B failing in reception from the access point A increases. In the second embodiment, the wireless network 100' where good communication can be carried out without deterioration of communication quality even in such a case will be described.

Description of Configuration

Figure 6:
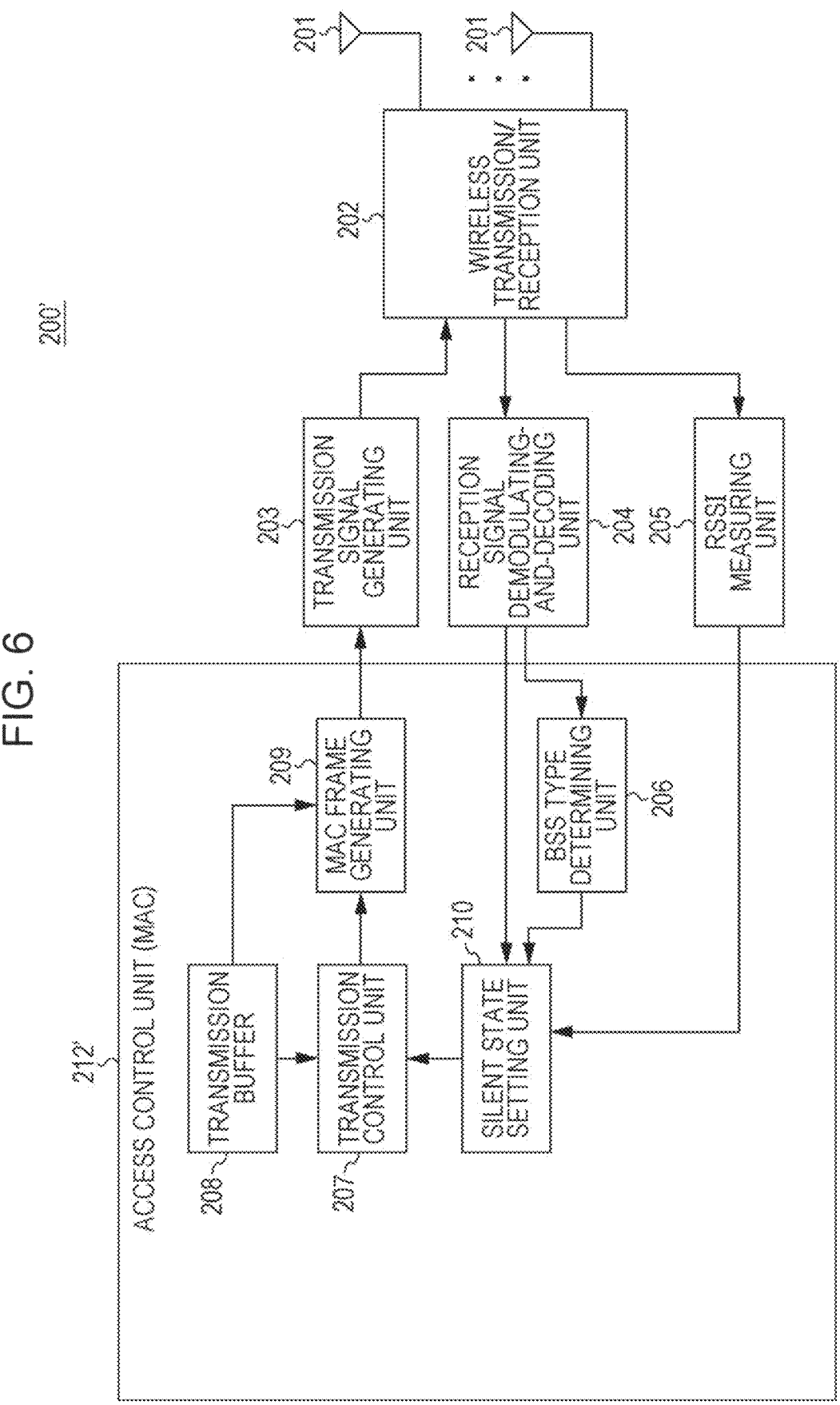
FIG. 6 is a block diagram illustrating an example of the configuration of a terminal used in the second embodiment.

FIG. 6 is a block diagram illustrating an example of the configuration of a terminal 200' according to the second embodiment. The terminal 200' exemplified in FIG. 6 corresponds to the terminal C in FIG. 5. Note that the configurations of the access points A and D, and the terminal B, illustrated in FIG. 5, may also be the same configuration as that of the terminal 200' illustrated in FIG. 6.

As illustrated in FIG. 6, the terminal 200' has the transmission/reception antennas 201, wireless transmission/reception unit 202, transmission signal generating unit 203, reception signal demodulating-and-decoding unit 204, RSSI measuring unit 205, BSS type determining unit 206, transmission control unit 207, transmission buffer 208, MAC frame generating unit 209, and silent state setting unit 210. Also, the BSS type determining unit 206, transmission control unit 207, transmission buffer 208, MAC frame generating unit 209, and silent state setting unit 210 make up an access control unit 212' (MAC). That is to say, the terminal 200' according to the second embodiment differs from the configuration of the terminal 200 according to the first embodiment that is illustrated in FIG. 2 with regard to the point that it does not have the terminal information setting unit 211. The operations of the silent state setting unit 210 also differ somewhat from those in the first embodiment.

The silent state setting unit 210 performs NAV settings based on the RSSI information input from the RSSI measuring unit 205, the MAC frame input from the reception signal demodulating-and-decoding unit 204, and BSS type information input from the BSS type determining unit 206. Also, the silent state setting unit 210 performs NAV cancellation in a case of the set NAV period having expired, or a CF-End frame instructing NAV cancellation is received.

Note that when setting a NAV, the silent state setting unit 210 distinguishes between intra-BSS NAV and regular NAV states, so the above-described NAV settings and NAV cancellations are performed with regard to the respective NAVs. Specifically, in a case of having received a MAC frame from the intra-BSS, the silent state setting unit 210 performs intra-BSS settings, and in a case of having received a MAC frame from the OBSS, performs regular NAV settings.

Note however, that the silent state setting unit 210 performs determination of whether or not to cancel a NAV using a later-described NAV cancellation determination method, and in a case where determination is made in this determining to cancel a NAV, regular NAV cancellation is performed even other than the above-described. The silent state setting unit 210 outputs silent state information relating to NAV settings or NAV cancellation to the transmission control unit 207.

Operation Example

The operation example of the wireless network 100' in the second embodiment is the same as the operation example illustrated in FIG. 3 or in FIG. 4, so description will be omitted. Note however, that the NAV cancellation determination methods in ST106 in FIG. 3 or ST203 in FIG. 4 differs somewhat from the NAV cancellation determination methods 1 and 2 described in the first embodiment. The following is a description of the NAV cancellation determination method according to the second embodiment.

NAV Cancellation Determination Method

The NAV cancellation determination method described below corresponds to the determination method of ST106 in FIG. 3. In the NAV cancellation determination method according to the second embodiment, the terminal C sets a threshold value regarding an upper limit value of trigger signals (third threshold value), a threshold value regarding lower limit values of trigger signals (fourth threshold value), and a threshold value regarding response signals (second threshold value). Now, a trigger signal is an RTS frame for example, and a response signal is a CTS frame for example. The third, fourth, and second threshold values are set higher than the threshold value regarding intra-BSS signals.

In a case of having received a trigger signal (RTS frame) from the OBSS (ST102 in FIG. 3), the terminal C measures the RSSI of the RTS frame, and determines whether higher than the third threshold value or not, and also determines whether lower than the fourth threshold value or not. That is to say, the terminal C determines whether or not the RSSI of the RTS frame is within a predetermined range stipulated by the third and the fourth threshold values.

Further, the terminal C measures the RSSI of the response signal (CTS frame) transmitted from the OBSS, and determines whether lower than the second threshold value or not. In a case where the RSSI of the RTS frame is within the predetermined range, and also the RSSI of the CTS frame is lower than the second threshold value, the terminal C cancels the regular NAV.

The third threshold value may be the OBSS_PD for example, and the fourth threshold value may be a predetermined greater than the third threshold value. For example, the fourth threshold value is the third threshold value to which a positive offset value has been added. Thus, the signaling amount necessary for notification of the fourth threshold value can be reduced.

In the second embodiment, NAV cancellation is performed at the terminal C only in a case where the RSSI of the trigger signal from the OBSS is within a predetermined range (range higher than the third threshold value and lower than the fourth threshold value), and also the RSSI of the response signal is lower than the second threshold value. Accordingly, in a case where reduction of reception quality at the terminal B due to interference from the terminal C is expected due to the distance between the access point A and the terminal C being close or the like, NAV cancellation is prevented in a case where the RSSI of the trigger signal is not within a predetermined range, whereby deterioration of communication performance at the wireless network 100' can be prevented. Thus, inappropriate regular NAV cancellation can be prevented, and communication performance of the wireless network can be improved.

Although an operation example when transmitting/receiving an RTS/CTS frame has been described in the operation example of the second embodiment described above, the present disclosure is not restricted to this. That is to say, the second embodiment can also be applied to when transmitting/receiving a trigger frame.

Third Embodiment

Figure 7:
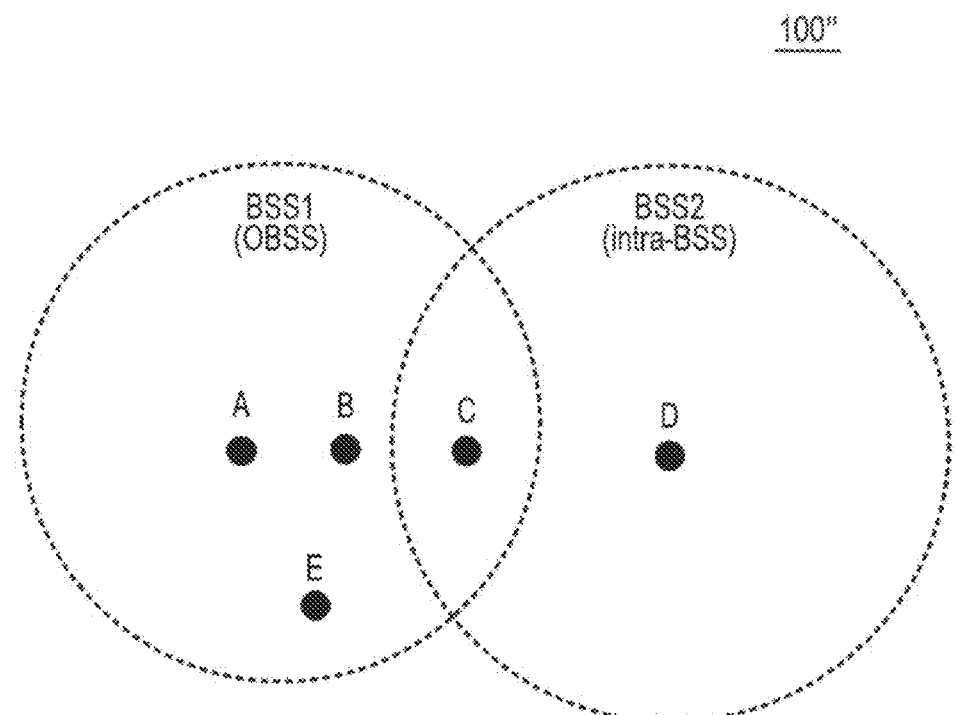
FIG. 7 is a diagram illustrating positional relation among access points and terminals making up a wireless network in a third embodiment.

A third embodiment will be described below. FIG. 7 is a diagram exemplifying the positional relation of access points and terminals configuring a wireless network 100" according to the third embodiment. This differs from the wireless network 100 according to the first embodiment illustrated in FIG. 1, with regard to the point of the presence of a terminal E belonging to the BSS1 (OBSS), as illustrated in FIG. 7.

In this configuration, there are cases where the access point A transmits a trigger frame requesting transmission of a MU-BA (Multi-User Block Ack) to multiple terminals, such as the terminal B, terminal E, and so forth, for example. Block Ack is stipulated in IEEE 802.11e, and is a response regarding multiple received data with a single frame. Also, MU-BA multiplexes multiple users by MU (Multi-User) multiplexing, and performs Block Ack transmission. MU multiplexing is frequency multiplexing and spatial multiplexing of multiple terminals.

In such a case, a situation can occur where an MU-BA transmission from the terminal B and terminal E that have received the trigger frame is not received by the access point A due to interference by the terminal C, for example. If such a situation occurs, the access point A resends the trigger frame requesting transmission of the MU-BA to the terminal B and terminal E again, so the communication amount increases, and the communication performance of the wireless network 100" may drop. The wireless network 100" that can perform good communication without lower communication quality even in such cases will be described in the third embodiment.

Description of Configuration

Figure 8:
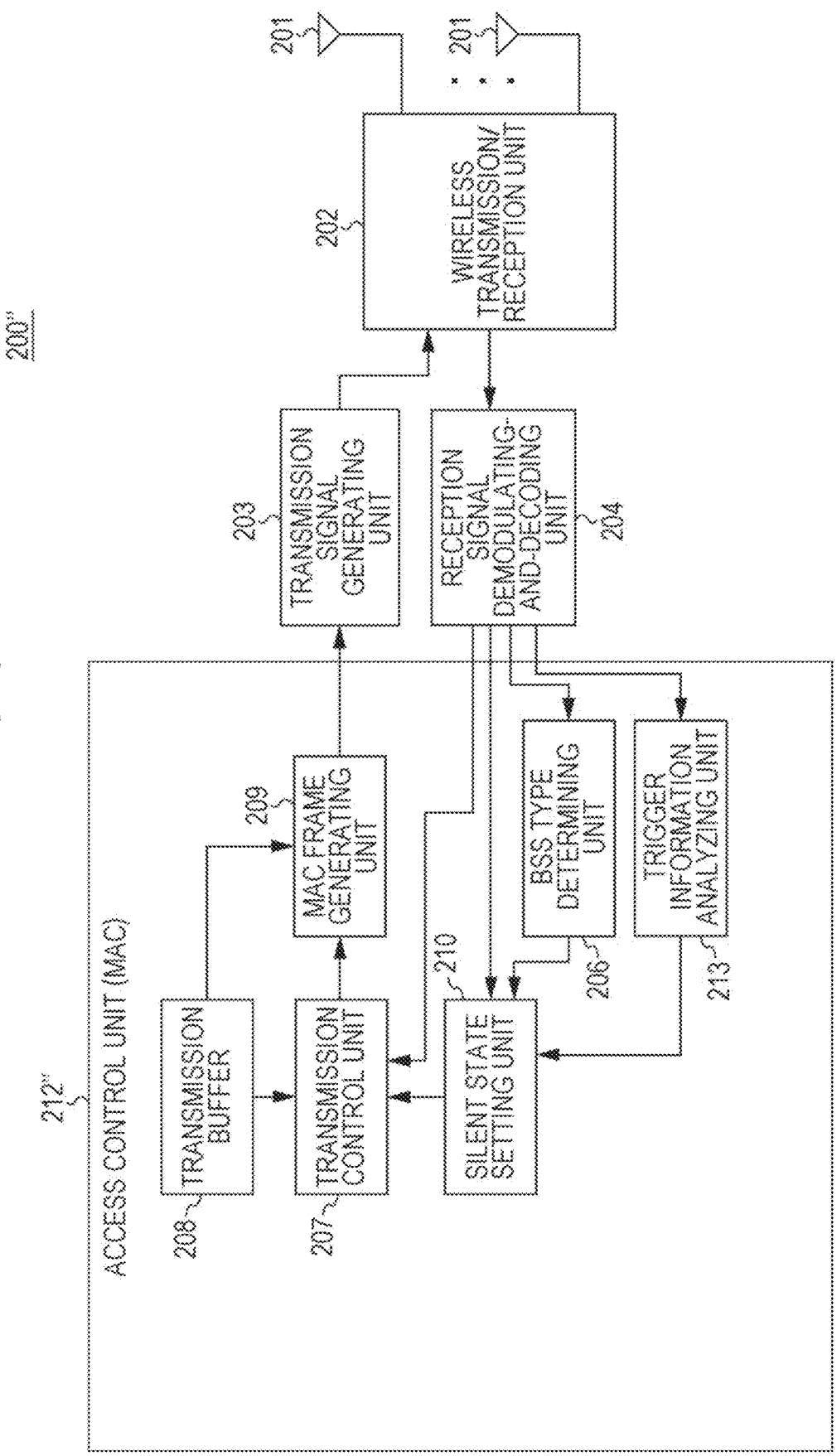
FIG. 8 is a block diagram illustrating an example of the configuration of a terminal used in the third embodiment.

FIG. 8 is a block diagram illustrating an example of the configuration of a terminal 200" according to the third embodiment. The terminal 200" exemplified in FIG. 8 corresponds to the terminal C in FIG. 7. Note that the configurations of the access points A and D, and the terminal B and E, illustrated in FIG. 7, may also be the same configuration as that of the terminal 200" illustrated in FIG. 8.

As illustrated in FIG. 8, the terminal 200" has the transmission/reception antennas 201, wireless transmission/reception unit 202, transmission signal generating unit 203, reception signal demodulating-and-decoding unit 204, BSS type determining unit 206, transmission control unit 207, transmission buffer 208, MAC frame generating unit 209, silent state setting unit 210, and a trigger information analyzing unit 213. Also, the BSS type determining unit 206, transmission control unit 207, transmission buffer 208, MAC frame generating unit 209, silent state setting unit 210, and trigger information analyzing unit 213 make up an access control unit 212" (MAC). That is to say, the terminal 200' according to the third embodiment differs from the configuration of the terminal 200 according to the first embodiment that is illustrated in FIG. 2 with regard to the point that it does not have the RSSI measuring unit 205 and the terminal information setting unit 211, and has the trigger information analyzing unit 213. The operations of the silent state setting unit 210 also differ somewhat from those in the first and second embodiments.

The trigger information analyzing unit 213 extracts trigger type information relating to the trigger type from a trigger frame input from the reception signal demodulating-and-decoding unit 204, and outputs to the silent state setting unit 210.

The silent state setting unit 210 performs NAV settings based on the MAC frame input from the reception signal demodulating-and-decoding unit 204, the BSS type information input from the BSS type determining unit 206, and the trigger type input from the trigger information analyzing unit 213. Also, the silent state setting unit 210 performs NAV cancellation in a case of the set NAV period having expired, or a CF-End frame instructing NAV cancellation is received.

Note that when setting a NAV, the silent state setting unit 210 distinguishes between intra-BSS NAV and regular NAV states, so the above-described NAV settings and NAV cancellations are performed with regard to the respective NAVs. Specifically, in a case of having received a MAC frame from the intra-BSS, the silent state setting unit 210 performs intra-BSS settings, and in a case of having received a MAC frame from the OBSS, performs regular NAV settings.

Note however, that the silent state setting unit 210 performs determination of whether or not to cancel a NAV using a later-described NAV cancellation determination method, and in a case where determination is made in this determining to cancel a NAV, regular NAV cancellation is performed even other than the above-described. The silent state setting unit 210 outputs silent state information relating to NAV settings or NAV cancellation to the transmission control unit 207.

Operation Example

Figure 9:
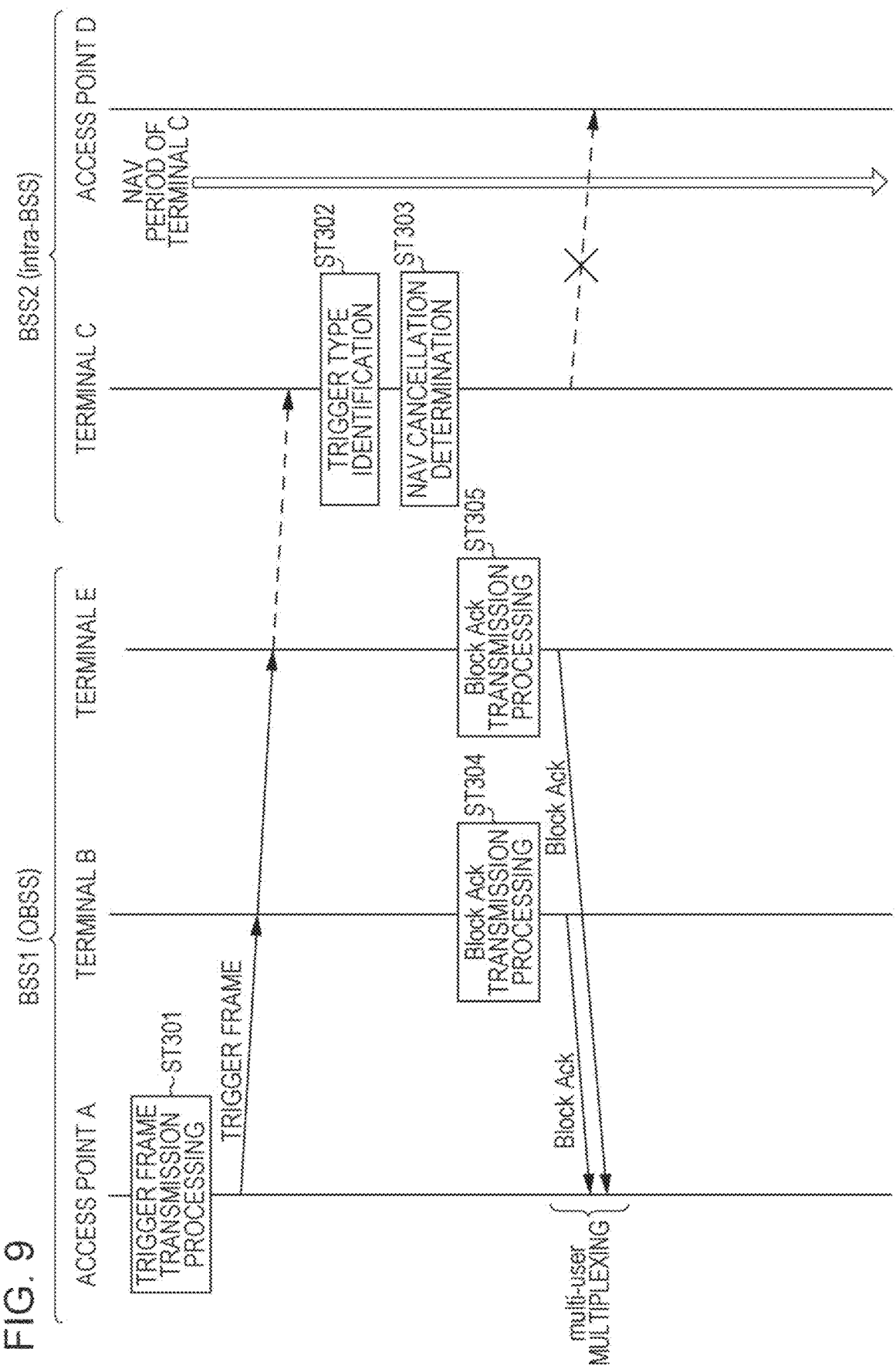
FIG. 9 is a sequence diagram illustrating an operation example of a wireless network when exchanging trigger frames in the third embodiment.

FIG. 9 is a sequence diagram illustrating an operation example of the wireless network 100" when transmitting/receiving a trigger frame in the third embodiment. In FIG. 9, the terminal C has set a regular NAV beforehand.

First, the access point A transmits a trigger frame requesting MU-BA transmission to the terminal B and terminal E (ST301), as illustrated in FIG. 9.

Upon receiving the trigger frame from the access point A, the terminal C identifies the trigger type (ST302). Based on the identification results in ST302, the terminal C performs determination regarding whether or not to perform cancellation of the regular NAV (ST303). Details of the regular NAV cancellation determination method in ST303 will be described later.

FIG. 9 exemplifies a case where determination is made in ST303 not to cancel the regular NAV. In this case, the terminal C continues the regular NAV, and maintains the silent state.

Next, the terminal B and terminal E perform MU-BA transmission to the access point A (ST304 and ST305). At this time, the regular NAV is set at the terminal C, so the terminal C does not transmit to the access point D.

NAV Cancellation Determination Method

Details of the determination method of whether to cancel a regular NAV or not, in ST303 in FIG. 9 will be described. AN MU-BA is transmitted in the UL MU PPDU in 11ax. As described earlier, at the time of reception of MU-BA from multiple terminals, if reception fails at the access point A side due to interference, the communication amount increases due to resending of the trigger frame and MU-BA, and the communication performance of the wireless network 100" drops. Accordingly, occurrence of interference is preferably avoided. Also, the PPDU length of the MU-BA is short, so the effect of cancelling the regular NAV is small.

Accordingly, upon receiving a trigger frame, the terminal C in the third embodiment extracts trigger type information and determines the trigger type, and in a case where the trigger type is a multi-user block Ack request (MU-BAR) requesting transmission of an MU-BA, does not cancel the regular NAV.

Thus, in the third embodiment, determination is made regarding whether or not to cancel the regular NAV based on the trigger type, and in a case where the trigger type is an MU-BAR, the regular NAV is not cancelled. Accordingly, the MU-BA is transmitted/received with priority, so lower communication performance of the wireless network 100" due to resending of the trigger frame and MU-BA can be prevented, and the effects of SR can be maintained. Note that in a case where determination is made that the received trigger frame is other than an MU-BAR, the terminal C can perform conventional NAV control to maintain the effects of SR. Thus, inappropriate regular NAV cancellation can be prevented, and communication performance of the wireless network can be improved.

Although the third embodiment has been described regarding a case where the access point A, terminal B, and terminal E are present in the OBSS and the access point A transmits a trigger frame including an MU-BAR to the terminal B and terminal E, the present disclosure is not restricted to this. The third embodiment can also be applied to a case where a greater number of terminals belongs to the OBSS, for example, and the access point A transmits an MU-BAR to these terminals.

Fourth Embodiment

A fourth embodiment will be described. The positional relation of the access points and terminals making up the wireless network 100" according to the fourth embodiment is the same as in the wireless network 100" according to the third embodiment, exemplified in FIG. 7.

If the number of access points and terminals performing multiplexing by SR (MU multiplexing number) with the access point A increases in the wireless network 100" such as exemplified in FIG. 7, the probability of reception failure due to SR increases because of the effects of positional relation among terminals, RSSI measurement precision, and so forth. An increase in the multiplexing number also increases noise, and the effects of interference by terminal C increases. Accordingly, a wireless network 100" that can perform good communication without reducing communication quality even in a case where the multiplexing number is great will be described with the fourth embodiment.

Description of Configuration

The configuration of the terminal 200" according to the fourth embodiment is the same as that of the terminal 200" according to the third embodiment illustrated in FIG. 8. However, the operations of the silent state setting unit 210 and trigger information analyzing unit 213 differ somewhat from that of the third embodiment.

The trigger information analyzing unit 213 extracts multiplexing number information relating to the MU multiplexing number included in a trigger frame input from the reception signal demodulating-and-decoding unit 204, and outputs this to the silent state setting unit 210.

The silent state setting unit 210 performs NAV settings based on the MAC frame input from the reception signal demodulating-and-decoding unit 204, the BSS type information input from the BSS type determining unit 206, and the multiplexing number information input from the trigger information analyzing unit 213. Also, the silent state setting unit 210 performs NAV cancellation in a case of the set NAV period having expired, or a CF-End frame instructing NAV cancellation is received.

Note that when setting a NAV, the silent state setting unit 210 distinguishes between intra-BSS NAV and regular NAV states, so the above-described NAV settings and NAV cancellations are performed with regard to the respective NAVs. Specifically, in a case of having received a MAC frame from the intra-BSS, for example, the silent state setting unit 210 performs intra-BSS settings, and in a case of having received a MAC frame from the OBSS, performs regular NAV settings.

Note however, that the silent state setting unit 210 performs determination of whether or not to cancel a NAV using a later-described NAV cancellation determination method, and in a case where determination is made in this determining to cancel a NAV, regular NAV cancellation is performed even other than the above-described. The silent state setting unit 210 outputs silent state information relating to NAV settings or NAV cancellation to the transmission control unit 207.

Operation Example

Figure 10:
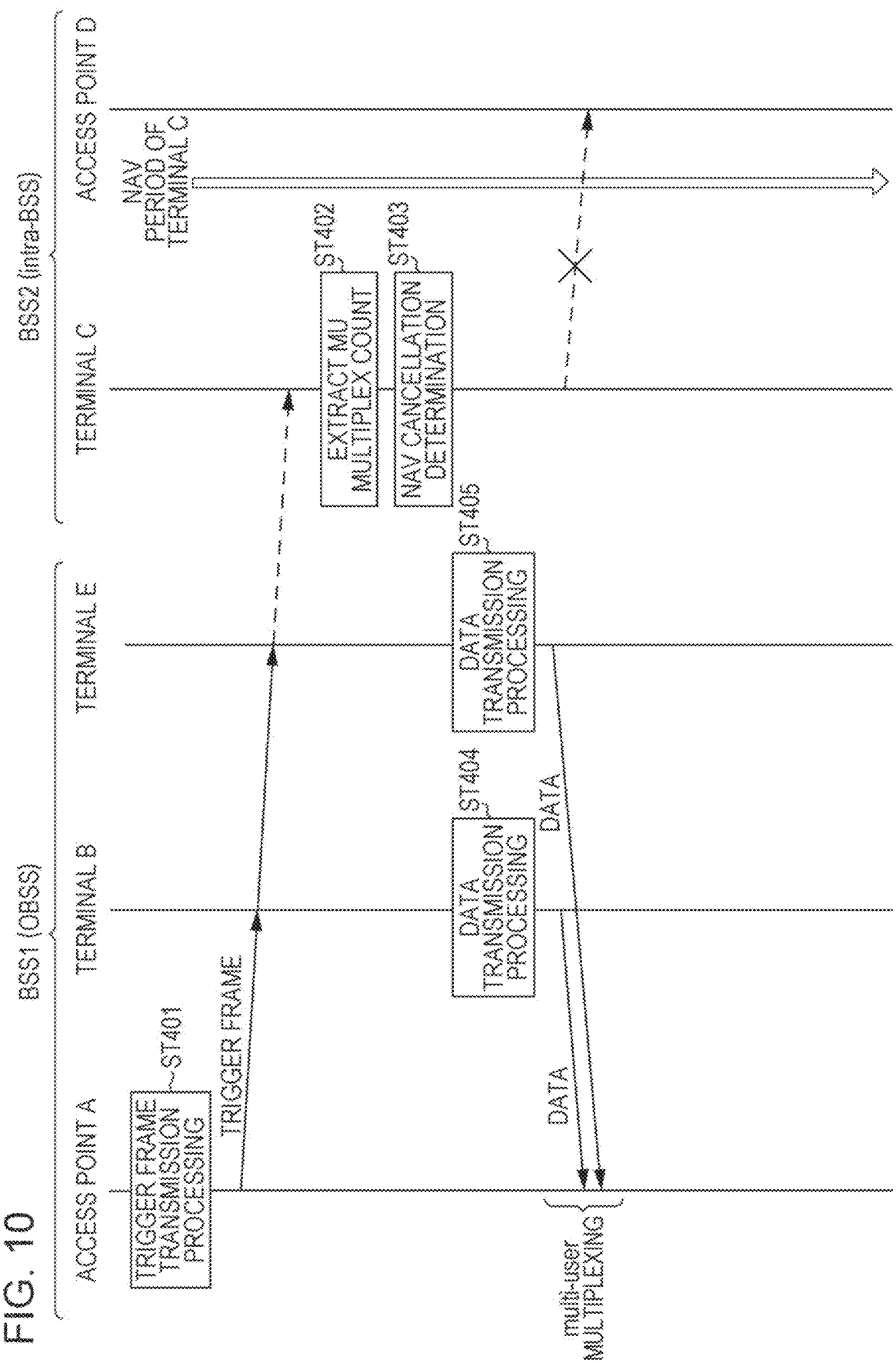
FIG. 10 is a sequence diagram illustrating an operation example of a wireless network when exchanging trigger frames in a fourth embodiment.

FIG. 10 is a sequence diagram illustrating an operation example of the wireless network 100" when transmitting/receiving a trigger frame in the fourth embodiment. In FIG. 10, the terminal C has set a regular NAV beforehand.

First, as illustrated in FIG. 10, the access point A transmits a trigger frame requesting data transmission to the terminal B and terminal E (in a case where a greater number of terminals exist within the OBSS, those terminals may be included as well) (ST401).

Upon receiving the trigger frame from the access point A, the terminal C extracts information relating to MU multiplexing number (ST402). Information relating to MU multiplexing number is included in the trigger frame, for example.

The terminal C performs determination based on the information relating to MU multiplexing number extracted in ST402, regarding whether or not to perform cancellation of the regular NAV (ST403). Details of the regular NAV cancellation determination method in ST403 will be described later.

FIG. 10 exemplifies a case where determination is made in ST403 not to cancel the regular NAV. In this case, the terminal C continues the regular NAV, and maintains the silent state.

Next, the terminal B and terminal E perform transmission of data to the access point A (ST404 and ST405). At this time, the regular NAV is set at the terminal C, so the terminal C does not transmit to the access point D.

NAV Cancellation Determination Method

Details of the determination method of whether to cancel a regular NAV or not, in ST403 in FIG. 10 will be described below. That is to say, in a case where the MU multiplexing number notified by the trigger frame is higher than a predetermined threshold value, the terminal C does not cancel the regular NAV.

In the fourth embodiment, determination is made regarding whether or not to cancel the regular NAV in accordance with the MU multiplexing number, and the regular NAV is not cancelled in a case where the MU multiplexing number is higher than a predetermined threshold value. Accordingly, lower communication performance of the wireless network 100" due to resending of the data can be prevented, and the effects of SR can be maintained. Note that in a case where the MU multiplexing number is equal to or lower than the predetermined threshold value, the terminal C can perform conventional NAV control to maintain the effects of SR. Thus, inappropriate regular NAV cancellation can be prevented, and communication performance of the wireless network can be improved.

Fifth Embodiment

Figure 11:
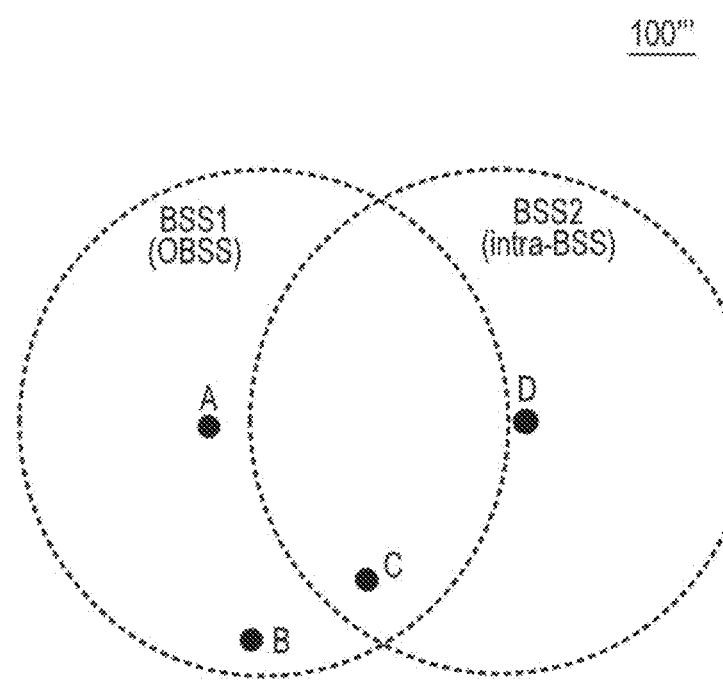
FIG. 11 is a diagram illustrating positional relation among access points and terminals making up a wireless network in a fifth embodiment.

A fifth embodiment will be described below. FIG. 11 is a diagram illustrating the positional relation of access points and terminals configuring a wireless network 100''' according to the fifth embodiment. In the wireless network 100''', the distance from the terminal B to the access point A and the distance from the terminal C and the access point A are approximately equal, or within a predetermined difference, as illustrated in FIG. 11.

In such a case, the RSSI of transmission signals from the terminal B to the access point A is close to the RSSI of transmission signals from the terminal C to the access point A. Here, the reception quality at the access point A may deteriorate since the strength of transmission signals from the terminal B (desired signals) and the strength of transmission signals from the terminal C (interference signals) are approximately the same, so there are cases that reception quality deteriorates at the access point A. In the fifth embodiment, the wireless network 100''' where good communication can be carried out without deterioration of communication quality even in such a case, will be described.

Description of Configuration

Figure 12:
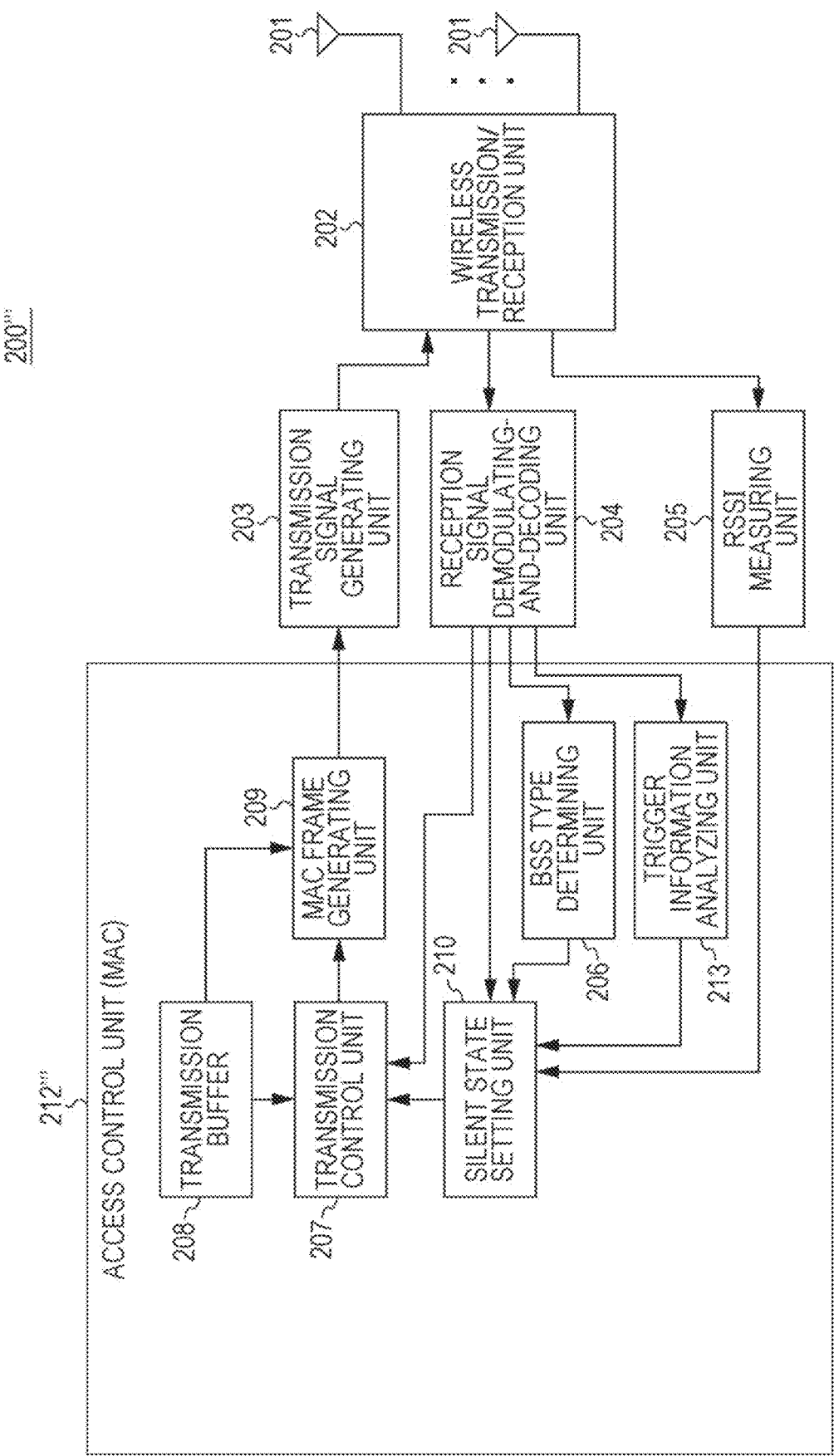
FIG. 12 is a block diagram illustrating the configuration of a terminal used in the fifth embodiment.

FIG. 12 is a block diagram illustrating the configuration of a terminal 200''' according to the fifth embodiment. The terminal 200''' exemplified in FIG. 12 corresponds to the terminal C in FIG. 11. Note that the configurations of the access points A and D, and the terminal B, illustrated in FIG. 11, may also be the same configuration as that of the terminal 200''' illustrated in FIG. 12.

As illustrated in FIG. 12, the terminal 200''' has the transmission/reception antennas 201, wireless transmission/reception unit 202, transmission signal generating unit 203, reception signal demodulating-and-decoding unit 204, RSSI measuring unit 205, BSS type determining unit 206, transmission control unit 207, transmission buffer 208, MAC frame generating unit 209, silent state setting unit 210, and trigger information analyzing unit 213. Also, the BSS type determining unit 206, transmission control unit 207, transmission buffer 208, MAC frame generating unit 209, silent state setting unit 210, and trigger information analyzing unit 213 make up an access control unit 212''' (MAC). That is to say, the terminal 200''' according to the fifth embodiment differs from the configuration of the terminal 200 according to the first embodiment that is illustrated in FIG. 2 with regard to the point that it does not have the terminal information setting unit 211, and has the trigger information analyzing unit 213. The operations of the silent state setting unit 210 also differ somewhat from those in the first embodiment.

The trigger information analyzing unit 213 extracts a target RSSI and AP Tx power included in a trigger frame input from the reception signal demodulating-and-decoding unit 204, and outputs to the silent state setting unit 210.

The silent state setting unit 210 performs NAV settings based on the MAC frame input from the reception signal demodulating-and-decoding unit 204, the BSS type information input from the BSS type determining unit 206, and the target RSSI and AP Tx power input from the trigger information analyzing unit 213. Also, the silent state setting unit 210 performs NAV cancellation in a case of the set NAV period having expired, or a CF-End frame instructing NAV cancellation is received.

Note that when setting a NAV, the silent state setting unit 210 distinguishes between intra-BSS NAV and regular NAV states, so the above-described NAV settings and NAV cancellations are performed with regard to the respective NAVs. Specifically, in a case of having received a MAC frame from the intra-BSS, the silent state setting unit 210 performs intra-BSS settings, and in a case of having received a MAC frame from the OBSS, performs regular NAV settings.

Note however, that the silent state setting unit 210 performs determination of whether or not to cancel a NAV using a later-described NAV cancellation determination method, and in a case where determination is made in this determining to cancel a NAV, regular NAV cancellation is performed even other than the above-described. The silent state setting unit 210 outputs silent state information relating to NAV settings or NAV cancellation to the transmission control unit 207.

Operation Example

Figure 13:
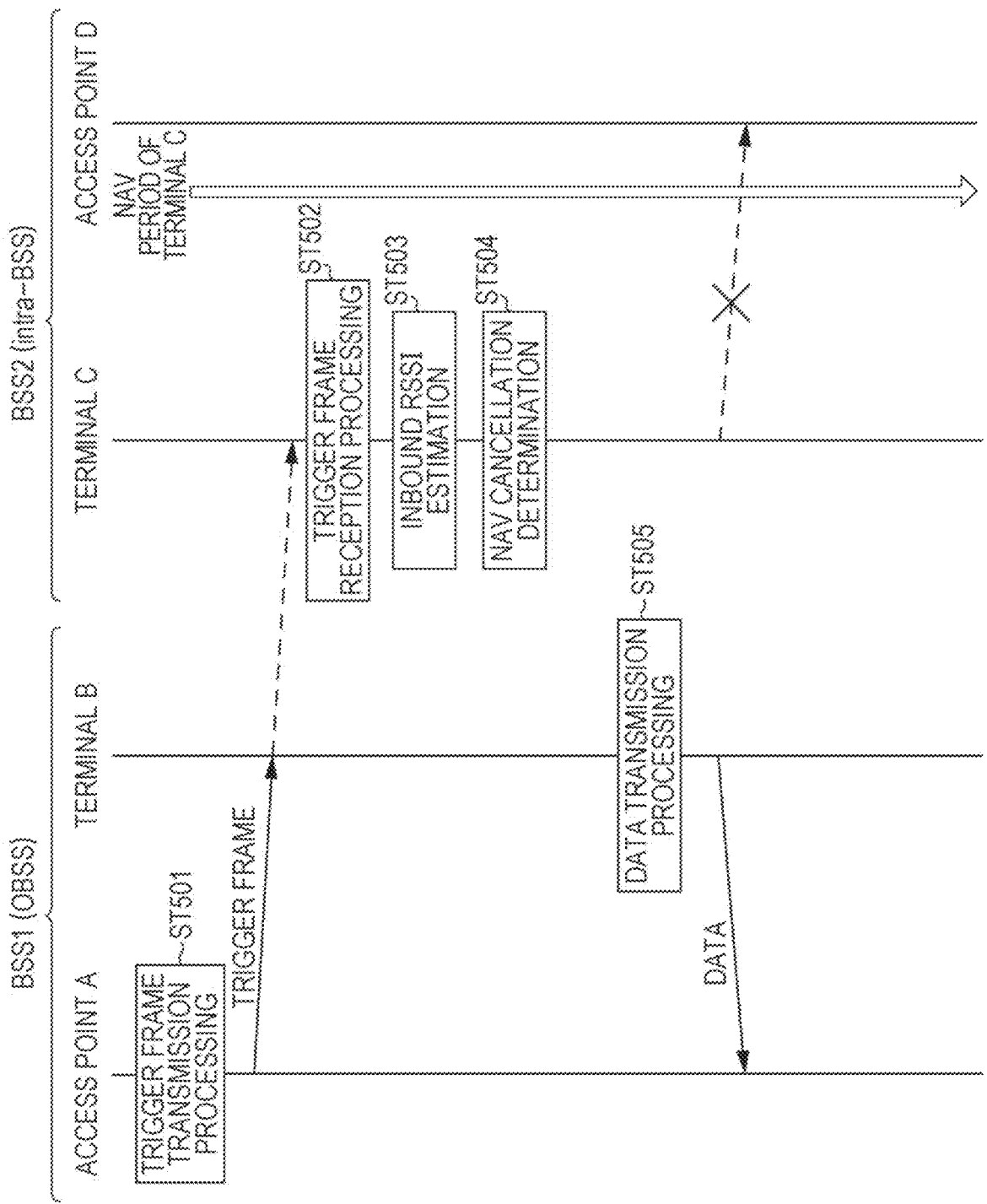
FIG. 13 is a sequence diagram illustrating an operation example of a wireless network when exchanging trigger frames in the fifth embodiment.

FIG. 13 is a sequence diagram illustrating an operation example of the wireless network 100''' when transmitting/receiving a trigger frame in the fifth embodiment. In FIG. 13, the terminal C has set a regular NAV beforehand.

First, the access point A transmits a trigger frame to the terminal B, as illustrated in FIG. 13 (ST501). The terminal C performs reception processing of the trigger frame from the access point A (ST502). The trigger frame reception processing includes extracting of the target RSSI and AP Tx power, and RSSI measurement. The terminal C estimates the RSSI measureable at the access point A when the terminal C transmits data, based on the target RSSI of the trigger frame and the AP Tx power extracted from the trigger frame (ST503). The terminal C then determines whether the RSSI estimated in ST503 is higher or not than a value obtained by adding a predetermined allowable interference amount to the target RSSI, and performs determination of whether or not to cancel the regular NAV based on the determination results (ST504). Details of the determination method regarding the regular NAV in ST504 will be described later.

FIG. 13 exemplifies a case where determination is made in ST503 to not cancel the regular NAV. In this case, the terminal C continues the regular NAV, and maintains the silent state.

Next, the terminal B performs transmission of data to the access point A (ST505). At this time, the regular NAV is set at the terminal C, so the terminal C does not transmit to the access point D.

NAV Cancellation Determination Method

Details of the determination method of whether to cancel a regular NAV or not, in ST504 in FIG. 13 will be described. Upon receiving a trigger frame from the OBSS, the terminal C estimates the RSSI measureable at the access point A of the OBSS when the terminal C transmits data, based on the RSSI of the trigger frame and the AP Tx power extracted from the trigger frame, as described above. Based on this, the terminal C determines whether the estimated RSSI is higher or not than the value obtained by adding the predetermined allowable interference amount to the target RSSI. In a case where the estimated RSSI is higher than the value obtained by adding the predetermined allowable interference amount to the target RSSI, the terminal C does not cancel the regular NAV. Note that the predetermined allowable interference amount is a margin set beforehand.

Thus, in the fifth embodiment, The strength (target RSSI) of signals transmitted from the terminal B (desired signals) at the access point A is compared with the strength (estimated RSSI) of signals transmitted from the terminal C (interference signals), and in a case where the estimated RSSI is higher than the value obtained by adding the predetermined allowable interference amount to the target RSSI, the terminal C does not cancel the regular NAV. Accordingly, deterioration of communication performance at the wireless network 100''' can be reduced. Thus, inappropriate regular NAV cancellation can be prevented, and communication performance of the wireless network can be improved.

Sixth Embodiment

Figure 14:
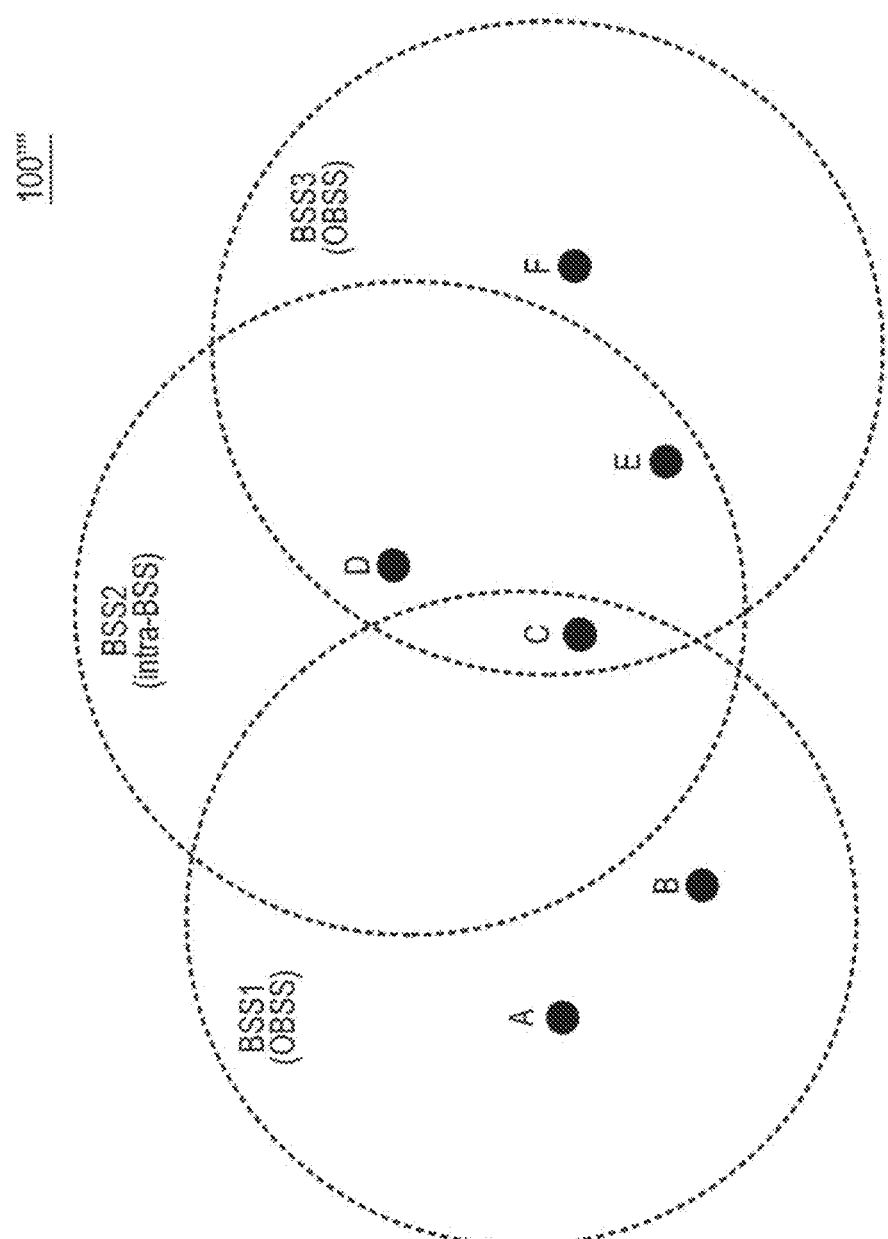
FIG. 14 is a diagram illustrating positional relation among access points and terminals making up a wireless network in a sixth embodiment.

The following is a description of a sixth embodiment. FIG. 14 is a diagram exemplifying the positional relation of access points and terminals configuring a wireless network 100'''' according to the sixth embodiment. In the sixth embodiment, existing in the wireless network 100 are, as illustrated in FIG. 14, an access point A, a terminal B, a terminal C, an access point D, a terminal E, and an access point F. The access point A and terminal B belong to a BSS1 (OBSS), the terminal C and access point D belong to a BSS2 (intra-BSS), and the terminal E and access point F belong to a BSS3 (OBSS)

In a case where multiple OBSSs exist in 11ax, the terminal C does not distinguish and manage NAVs for the multiple OBSSs, so there are cases where cancelling of a NAV of one of the OBSSs results in relatively great interference at other OBSSs. Description will be made in the sixth embodiment regarding the wireless network 100'''', where good communication can be carried out without deterioration of communication quality even in such cases.

Description of Configuration

Figure 15:
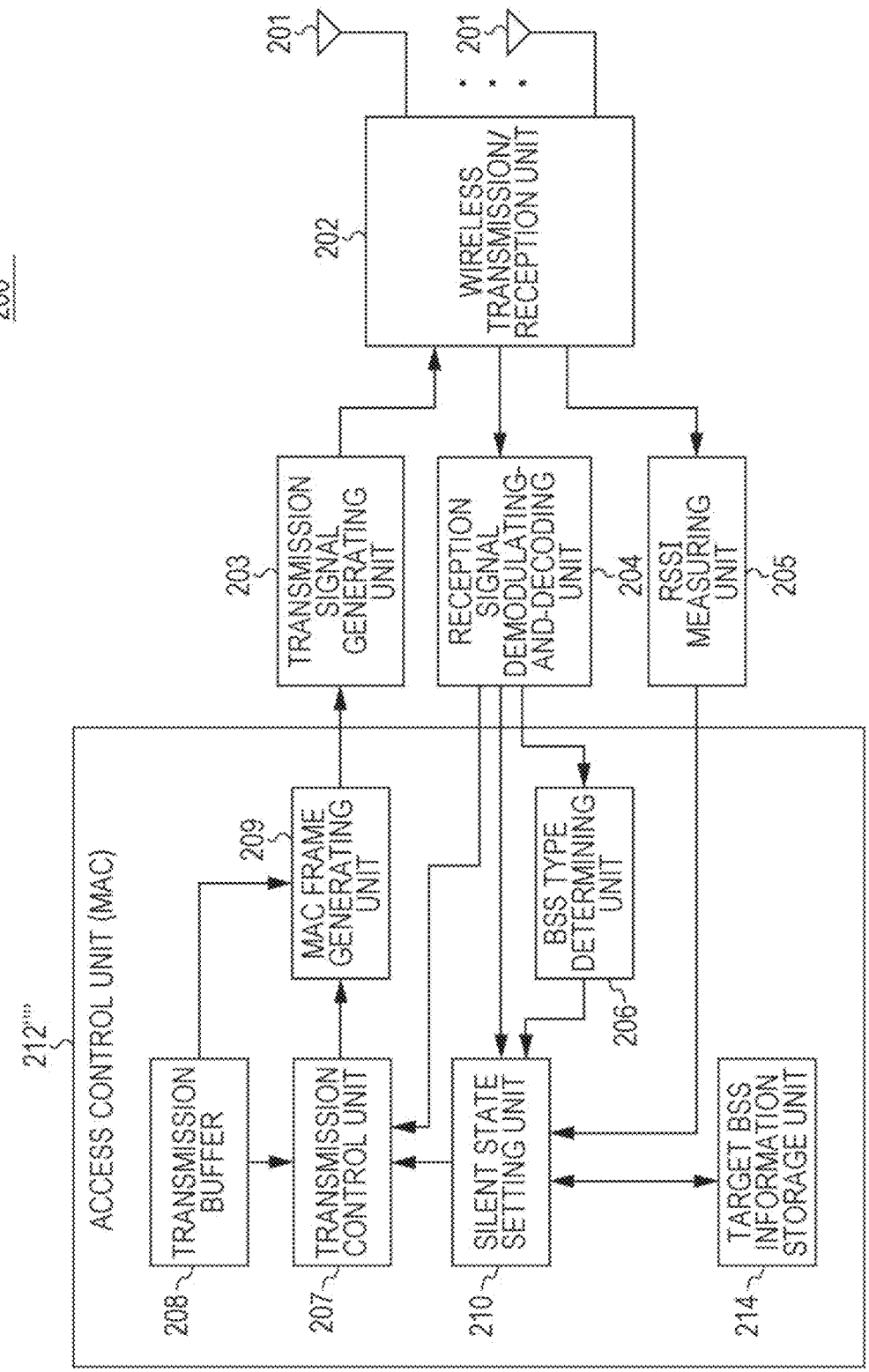
FIG. 15 is a block diagram illustrating an example of the configuration of a terminal used in the sixth embodiment.

FIG. 15 is a block diagram illustrating an example of the configuration of a terminal 200'''' according to the sixth embodiment. The terminal 200'''' illustrated in FIG. 15 corresponds to the terminal C in FIG. 14. Note that the configurations of the access points A, D and F, and the terminals B and E, illustrated in FIG. 14, may also be the same configuration as that of the terminal 200'''' illustrated in FIG. 15.

As illustrated in FIG. 15, the terminal 200'''' has the transmission/reception antennas 201, wireless transmission/reception unit 202, transmission signal generating unit 203, reception signal demodulating-and-decoding unit 204, RSSI measuring unit 205, BSS type determining unit 206, transmission control unit 207, transmission buffer 208, MAC frame generating unit 209, silent state setting unit 210, and a target BSS information storage unit 214. Also, the BSS type determining unit 206, transmission control unit 207, transmission buffer 208, MAC frame generating unit 209, silent state setting unit 210, and target BSS information storage unit 214 make up an access control unit 212'''' (MAC).

The silent state setting unit 210 performs NAV settings based on the RSSI information input from the RSSI measuring unit 205, the MAC frame input from the reception signal demodulating-and-decoding unit 204, the BSS type information input from the BSS type determining unit 206, and the target BSS information input from the target BSS information storage unit 214. Details of the target BSS information will be described later. Also, the silent state setting unit 210 performs NAV cancellation in a case of the set NAV period having expired, or a CF-End frame instructing NAV cancellation is received.

Note that when setting a NAV, the silent state setting unit 210 distinguishes between intra-BSS NAV and regular NAV states, so the above-described NAV settings and NAV cancellations are performed with regard to the respective NAVs. Specifically, in a case of having received a MAC frame from the intra-BSS, the silent state setting unit 210 performs intra-BSS settings, and in a case of having received a MAC frame from the OBSS, performs regular NAV settings.

Note however, that the silent state setting unit 210 performs determination of whether or not to cancel a NAV using a later-described NAV cancellation determination method, and in a case where determination is made in this determining to cancel a NAV, regular NAV cancellation is performed even other than the above-described. The silent state setting unit 210 outputs silent state information relating to NAV settings or NAV cancellation to the transmission control unit 207. Also, in a case where updating of target BSS information is necessary, the silent state setting unit 210 generates new target BSS information and outputs to the target BSS information storage unit 214.

The target BSS information storage unit 214 stores target BSS information. Upon being input with new target BSS information from the silent state setting unit 210, the target BSS information storage unit 214 updates the stored target BSS information with the new target BSS information. The target BSS information storage unit 214 also outputs the stored target BSS information to the silent state setting unit 210 as necessary.

Operation Example

Figure 16:
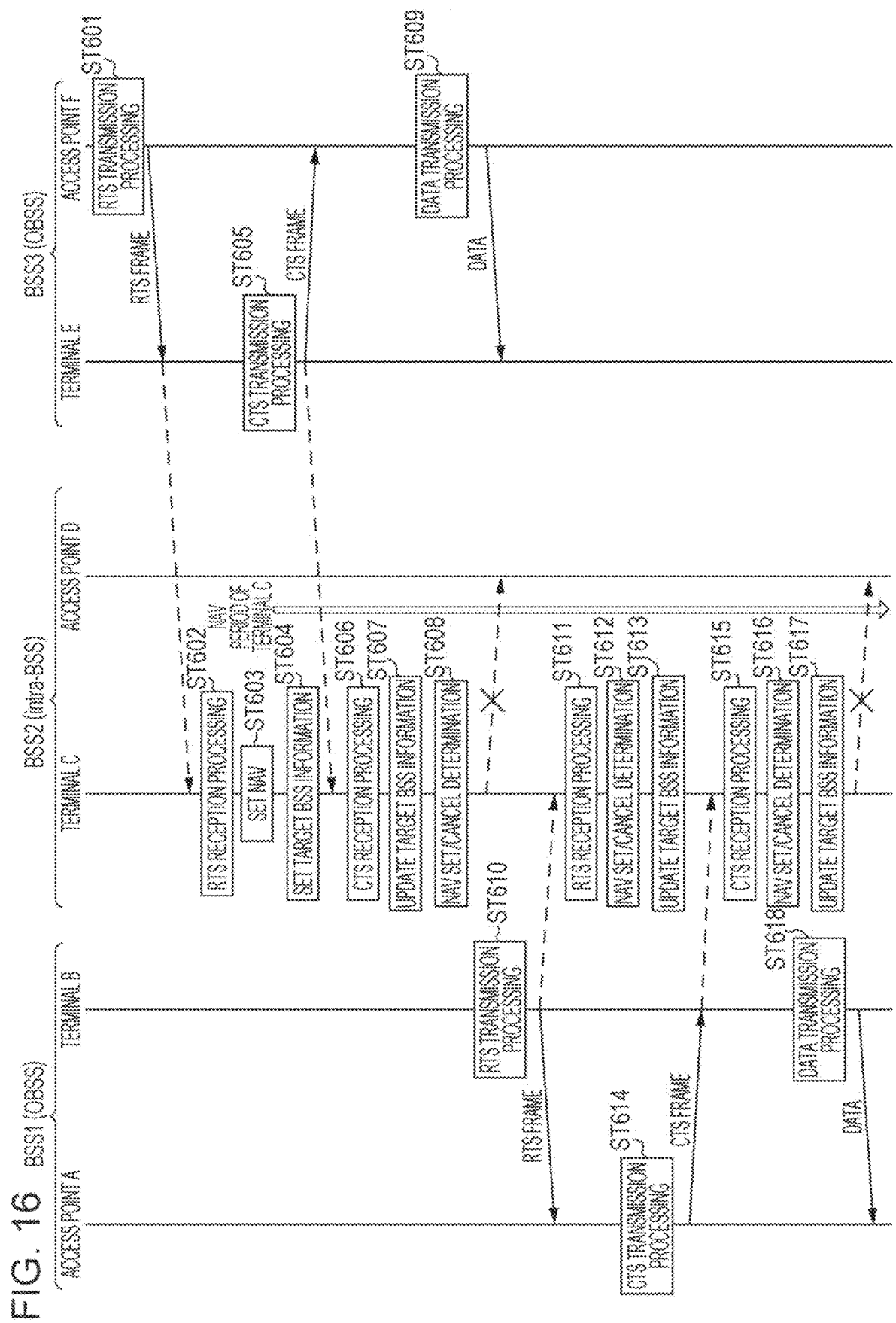
FIG. 16 is a sequence diagram illustrating an operation example of a wireless network when exchanging RTS/CTS frames in the sixth embodiment.

FIG. 16 is a sequence diagram illustrating an operation example of the wireless network 100'''' when transmitting/receiving an RTS/CTS frame in the sixth embodiment.

First, the access point F transmits an RTS frame to the terminal E, as illustrated in FIG. 16 (ST601). The terminal C preforms reception processing of the RTS frame from the access point F (ST602). The RTS frame reception processing includes extracting BSS color from the RTS frame, and RSSI measurement of the RTS frame. The terminal C sets a regular NAV in accordance with the RTS frame (ST603).

Upon setting the regular NAV, the terminal C generates target BSS information (ST604). Now, the target BSS information is information indicating the OBSS where the NAV has been set. That is to say, the target BSS information generated in ST604 is information indicating that the target is the BSS3 illustrated in FIG. 14. Note that target BSS information indicates the BSS color of the target BSS and the RSSI of the RTS frame.

Next, the terminal E transmits a CTS frame that is a response signal as to the RTS frame, to the access point F (ST605). The terminal C performs reception processing of the CTS frame from the terminal E (ST606). The CTS frame reception processing includes extracting BSS color from the CTS frame and RSSI measurement of the CTS frame.

The terminal C then compares the RSSI stored in ST604 with the RSSI of the CTS frame received in ST606, and in a case where the RSSI of the CTS frame is higher, updates the target BSS information (ST607). The current RSSI (RSSI from the terminal E) here is higher than the stored RSSI (RSSI from the access point F), and the terminal C updates the target BSS information. Note that in ST607, the terminal C updates only the RSSI included in the target BSS information, and does not update the BSS color.

The terminal C performs determination regarding whether or not to cancel the regular NAV (ST608). Details of the regular NAV determination method in ST608 will be described later.

FIG. 16 exemplifies a case where determination is made in ST608 to not cancel the regular NAV. In this case, the terminal C continues the regular NAV, and maintains the silent state.

Next, the access point F transmits data to the terminal E (ST609). At this time, the regular NAV is set, so the terminal C does not transmit to the access point D.

Assumption will be made that next, the terminal B has transmitted an RTS frame to the access point A (ST610). The terminal C performs reception processing of the RTS frame from the terminal B (ST611). The RTS frame reception processing includes extracting BSS color from the RTS frame and RSSI measurement of the RTS frame.

The terminal C performs determination of whether or not to cancel the regular NAV (ST612). Details of the regular NAV determination method in ST612 will be described later.

FIG. 16 exemplifies a case where determination is made in ST612 to not cancel the regular NAV. In this case, the terminal C continues the regular NAV, and maintains the silent state. In a case where the regular NAV is not cancelled in ST612, the terminal C compares the stored RSSI with the current RSSI, and in a case where the current RSSI is higher, updates the target BSS information (ST613). Assumption will be made here that the stored RSSI (RSSI from the terminal E) is higher than the current RSSI (RSSI from the terminal B), and the terminal C does not update the target BSS information.

Next, the access point A transmits a CTS frame that is a response signal as to the RTS frame, to the terminal B (ST614). The terminal C performs reception processing of the CTS frame from the access point A (ST615). The CTS frame reception processing includes extracting BSS color from the CTS frame and RSSI measurement of the CTS frame.

The terminal C performs determination of whether or not to cancel the regular NAV (ST616). Details of the regular NAV determination method in ST616 will be described later.

FIG. 16 exemplifies a case where determination is made in ST616 to not cancel the regular NAV. In this case, the terminal C continues the regular NAV, and maintains the silent state. In a case where the regular NAV is not cancelled in ST616, the terminal C compares the stored RSSI with the current RSSI, and in a case where the current RSSI is higher, updates the target BSS information (ST617). Assumption will be made here that the stored RSSI (RSSI from the terminal E) is higher than the current RSSI (RSSI from the terminal B), and the terminal C does not update the target BSS information.

Next, the terminal B transmits data to the access point A (ST618). At this time, the regular NAV is set at the terminal C, so the terminal C does not transmit to the access point D.

NAV Cancellation Determination Method

The following is a detailed description of a method to determine whether or not to cancel a regular NAV, in ST608, ST612, and ST616 in FIG. 16.

When setting a regular NAV (ST603 in FIG. 16), the terminal C stores target BSS information where a set BSS is a target BSS, as described above. When determining whether or not to cancel the regular NAV (ST608, ST612, and ST616), cancellation of the regular NAV based on signals received from the target BSS is performed, but cancellation of the regular NAV based on signals received from any other BSS is not performed.

In a case where there is an update of the regular NAV, by reception of an RTS/CTS frame or the like, the terminal C updates the target BSS information using the BSS color and RSSI of the received signals in a case where the RSSI of the received signals is higher than the RSSI stored as the target BSS information. Note however, cancellation of a regular NAV due to the NAV period expiring can be performed regardless of the target BSS.

Thus, in the sixth embodiment, cancellation of a regular NAV based on signals received from a target BSS is performed, but cancellation of the regular NAV based on signals received from any other BSS is not performed. Accordingly, even in a case where there are multiple OBSSs present, a situation can be avoided where cancelling a NAV at one OBSS results in relatively great interference at other OBSSs. Thus, inappropriate regular NAV cancellation can be prevented, and communication performance of the wireless network can be improved.

Although various embodiments have been described with reference to the drawings, it is needless to say that the present disclosure is not restricted to these examples. It is apparent that one skilled in the art would be able to conceive various types of modifications or alterations within the scope laid forth in the Claims, and it is understood that these belong to the technical scope of the present disclosure as a matter of course. Components of the configurations in the above-described embodiments may be optionally combined without departing from the essence of the present disclosure.

It has been described in the first through sixth embodiments above that the terminal C cancels the NAV in a case of having received a CF-End frame. However, an arrangement may be made where, in a case of multiple OBSSs existing, the terminal C measures the RSSI of the CF-End frame, compares the measured RSSI with a stored RSSI of target BSS information, and cancels the regular NAV in a case where the RSSI of the CF-End frame is higher. According to such a configuration, inappropriate regular NAV cancellation can be prevented, and communication performance of the wireless network can be improved.

The method of cancelling the silent state in the above embodiments is not restricted to NAV cancellation. For example, application can be made in the same way to a case of temporarily entering a non-silent state without cancelling the NAV (managing the time for the non-silent state, and returning to the silent state again of the original NAV period is still valid even after that time elapses).

Also, in the above-described embodiments, an operation of reducing the interfering by reducing transmission power may be performed, instead of cancelling the silent state.

There are cases where an ACK cannot be returned with regard to reception of data in the above-described embodiments, in a case where the silent state cannot be cancelled. In this case, an operation may be performed of transmitting an ACK after NAV cancellation.

Although an example has been described in the above embodiments regarding a case where the present disclosure is configured of hardware, the present disclosure may be realized by software in cooperation with hardware.

The functional blocks used in the description of the above embodiments typically are realized as a large-scale integration (LSI) that is an integrated circuit. These may be individually formed into one chip, or part or all may be included in one chip. While description has been made regarding an LSI, there are different names such as integrated circuit (IC), system LSI, super LSI, and ultra LSI, depending on the degree of integration.

The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

Summarization of the Present Disclosure

A wireless station according to the present disclosure is a wireless station in a wireless network that has a plurality of wireless stations. The wireless station includes a reception unit that receives a trigger signal transmitted from a first wireless station belonging to an interference cell as to a second wireless station that belongs to the interference cell, and a network allocation vector control unit that, in a case where the reception unit receives the trigger signal after having set a network allocation vector as to another wireless station belonging to a communication cell which the own station belongs to, performs determination regarding whether or not to cancel the network allocation vector, based on the reception strength of the trigger signal.

In the wireless station according to the present disclosure, the wireless station is a wireless station conforming to IEEE 802.11 ax.

In the wireless station according to the present disclosure, the communication cell to which the own station belongs is an intra-BSS, and the interference cell is an OBSS or inter-BSS.

In the wireless station according to the present disclosure, the network allocation vector control unit performs determination of whether or not to cancel the network allocation vector based on a threshold value set in accordance with reception strength measurement precision of the own station, and reception strength of the trigger signal.

In the wireless station according to the present disclosure, the network allocation vector control unit sets the threshold value based on a terminal class (STA classes) stipulated in IEEE 802.11 ax.

In the wireless station according to the present disclosure, in a case of having received a response signal from the second wireless station as to the trigger signal, the network allocation vector control unit performs determination of whether or not to cancel the network allocation vector based on a threshold value set in accordance with reception strength measurement precision of the own station, reception strength of the trigger signal, and reception strength of the response signal.

In the wireless station according to the present disclosure, in a case where the reception strength of the trigger signal is within a predetermined range set based on the reception strength measurement precision of the own station, the network allocation vector control unit cancels the network allocation vector.

In the wireless station according to the present disclosure, the network allocation vector control unit distinguishes the type of the trigger signal, and in a case where the trigger signal is a trigger signal requesting response from a plurality of wireless stations in the interference cell, does not cancel the network allocation vector.

In the wireless station according to the present disclosure, in a case where the trigger signal is a trigger signal requesting response from a plurality of wireless stations in the interference cell, the network allocation vector control unit extracts information relating to the number of wireless stations regarding which the trigger signal requests a response, and performs determination of whether or not to cancel the network allocation vector based on the extracted information.

In the wireless station according to the present disclosure, the network allocation vector control unit compares the strength of a response signal from the second wireless station to the first wireless station that has been extracted from the trigger signal, with an estimated reception strength at the first wireless station of a signal transmitted from the own station to the first wireless station, and in a case where the difference thereof is smaller than a predetermined value, does not cancel the network allocation vector.

In the wireless station according to the present disclosure, in a case where the network allocation vector has been set due to a trigger signal from any one of wireless stations belonging to the interference cell, the network allocation vector control unit stores an identifier of the interference cell to which the wireless station that has transmitted the trigger signal causing setting of the network allocation vector belongs, and reception strength of the trigger signal causing setting of the network allocation vector, and in a case of newly receiving a trigger signal from an interference cell, cancels the network allocation vector in a case where the reception strength of the newly-received trigger signal is higher than the reception strength of the stored trigger signal.

A communication method according to the present disclosure is a communication method in a wireless network that has a plurality of wireless stations or access points. In a case where one wireless station of the plurality of wireless stations receives a trigger signal, transmitted from a first wireless station belonging to an interference cell to which the own station does not belong as to a second wireless station belonging to the interference cell, after having set a network allocation vector as to another wireless station belonging to a communication cell which the own station belongs to, the first wireless station performs determination regarding whether or not to cancel the network allocation vector, based on the reception strength of the trigger signal.

In the communication method according to the present disclosure, the wireless station is a wireless station conforming to IEEE 802.11 ax.

In the communication method according to the present disclosure, the communication cell to which the own station belongs is an intra-BSS, and the interference cell is an OBSS (Overlapping Basic Service Set) or inter-BSS.

In the communication method according to the present disclosure, the one wireless station performs determination of whether or not to cancel the network allocation vector based on a threshold value set in accordance with reception strength measurement precision of the own station, and reception strength of the trigger signal.

In the communication method according to the present disclosure, the one wireless station sets the threshold value based on a terminal class (STA classes) stipulated in IEEE 802.11ax.

In the communication method according to the present disclosure, in a case of having received a response signal from the second wireless station as to the trigger signal, the one wireless station performs determination of whether or not to cancel the network allocation vector based on a threshold value set in accordance with reception strength measurement precision of the own station, reception strength of the trigger signal, and reception strength of the response signal.

In the communication method according to the present disclosure, in a case where the reception strength of the trigger signal is within a predetermined range set based on the reception strength measurement precision of the own station, the one wireless station cancels the network allocation vector.

In the communication method according to the present disclosure, the one wireless station distinguishes the type of the trigger signal, and in a case of a trigger signal requesting response from a plurality of wireless stations in the interference cell, does not cancel the network allocation vector.

In the communication method according to the present disclosure, in a case where the trigger signal is a trigger signal requesting response from a plurality of wireless stations in the interference cell, the one wireless station extracts, from the trigger signal, information relating to the number of wireless stations regarding which the trigger signal requests a response, and performs determination of whether or not to cancel the network allocation vector based on the extracted information.

In the communication method according to the present disclosure, the one wireless station compares the strength of a response signal from the second wireless station to the first wireless station that has been extracted from the trigger signal, with a reception strength that has been estimated beforehand at the first wireless station, of a signal transmitted from the one wireless station to the first wireless station, and in a case where the difference thereof is smaller than a predetermined value, does not cancel the network allocation vector.

In the communication method according to the present disclosure, in a case where the network allocation vector has been set due to a trigger signal from any one of wireless stations belonging to the interference cell, the one wireless station stores an identifier of the interference cell to which the wireless station that has transmitted the trigger signal causing setting of the network allocation vector belongs, and reception strength of the trigger signal causing setting of the network allocation vector, and in a case of newly receiving a trigger signal from an interference cell, cancels the network allocation vector in a case where the reception strength of the newly-received trigger signal is higher than the reception strength of the stored trigger signal.

The present disclosure is suitable for a wireless station that performs good wireless communication under an environment where interference among wireless stations occurs.

What is claimed is:

1. An integrated circuit for a first wireless station that belongs to a communication cell, the integrated circuit comprising at least one input, which, in operation, inputs an electronic signal, and controller circuitry, which, in operation, controls:
   receiving, at the first wireless station, a trigger frame transmitted from an access point that belongs to an interference cell, the trigger frame soliciting uplink response signals from a plurality of terminal stations belonging to the interference cell and including a target RSSI (received signal strength indicator) that is a target reception power value of the uplink response signals at the access point;
   determining, at the first wireless station, based on i) a class of the first wireless station indicating RSSI measurement precision, ii) a parameter for an allowable interference level, and iii) a reception power value of the trigger frame received at the first wireless station, whether the first wireless station is allowed to transmit a signal to a second wireless station that belongs to the communication cell, wherein the parameter is set based on an access point transmit power of the access point and based on the target RSSI; and
   transmitting, from the first wireless station, the signal while the plurality of terminal stations transmit the uplink response signals by MU (Multi User) multiplexing.

2. The integrated circuit according to claim 1,
   wherein an estimated reception power value of the signal received at the access point is calculated based on the access point transmit power and the reception power value when the signal is transmitted from the first wireless station to the access point; and
   whether the first wireless station is allowed to transmit to the second wireless station is determined based on whether the estimated reception power value exceeds an acceptable receiver interference power.

3. The integrated circuit according to claim 1, wherein the controller circuitry, in operation, controls transmitting the signal from the first wireless station to the second wireless station, in response to the first wireless station having, in a transmission buffer, data to be transmitted from the first wireless station to the second wireless station and determining that the first wireless station is allowed to transmit the signal to the second wireless station.

4. The integrated circuit according to claim 1, wherein the controller circuitry, in operation, controls setting a period during which the first wireless station is allowed to transmit to the second wireless station.

5. The integrated circuit according to claim 1, wherein the controller circuitry, in operation, controls determining, based on an acceptable receiver interference power at the plurality of terminal stations that belong to the interference cell, whether the first wireless station is allowed to transmit the signal to the second wireless station.

6. The integrated circuit according to claim 1, wherein the controller circuitry, in operation, controls adjusting a transmit power of the first wireless station to transmit the signal to the second wireless station.

* * * * *